(12) United States Patent
Allen

(10) Patent No.: US 12,231,820 B2
(45) Date of Patent: Feb. 18, 2025

(54) SYSTEMS AND METHODS FOR FACILITATING PLACEMENT OF LABWARE COMPONENTS

(71) Applicant: Revvity Health Sciences, Inc., Waltham, MA (US)

(72) Inventor: Stephen Allen, Sudbury, MA (US)

(73) Assignee: Revvity Health Sciences, Inc., Waltham, MA (US)

( * ) Notice: Subject to any disclaimer, the term of this patent is extended or adjusted under 35 U.S.C. 154(b) by 0 days.

(21) Appl. No.: 17/711,959

(22) Filed: Apr. 1, 2022

(65) Prior Publication Data

US 2022/0337792 A1    Oct. 20, 2022

Related U.S. Application Data

(63) Continuation of application No. 14/958,130, filed on Dec. 3, 2015, now abandoned.

(60) Provisional application No. 62/087,550, filed on Dec. 4, 2014.

(51) Int. Cl.
| | |
|---|---|
| *H04N 9/31* | (2006.01) |
| *G01B 11/26* | (2006.01) |
| *G02B 21/06* | (2006.01) |
| *G02B 21/26* | (2006.01) |
| *G03B 21/00* | (2006.01) |
| *G03B 21/26* | (2006.01) |
| *B01L 3/00* | (2006.01) |

(52) U.S. Cl.
CPC ............ *H04N 9/3102* (2013.01); *G01B 11/26* (2013.01); *G02B 21/06* (2013.01); *G02B 21/26* (2013.01); *G03B 21/005* (2013.01); *G03B 21/26* (2013.01); *H04N 9/315* (2013.01); *H04N 9/3194* (2013.01); *B01L 3/5085* (2013.01); *B01L 2200/025* (2013.01); *B01L 2200/143* (2013.01); *B01L 2300/0829* (2013.01)

(58) Field of Classification Search
CPC .... H04N 9/3102; H04N 9/315; H04N 9/3194; G01B 11/26; G02B 21/06; G02B 21/26; G03B 21/005; G03B 21/26; B01L 3/5085; B01L 2200/025; B01L 2200/143; B01L 2300/0829; B01L 9/56
See application file for complete search history.

(56) References Cited

U.S. PATENT DOCUMENTS

| | | | |
|---|---|---|---|
| 2005/0102056 A1* | 5/2005 | Du | G01N 35/00584 700/214 |
| 2012/0050688 A1* | 3/2012 | Wu | G03B 21/14 353/121 |
| 2013/0079599 A1* | 3/2013 | Holmes | A61B 8/483 600/300 |
| 2017/0223244 A1* | 8/2017 | Short | G03B 21/142 |

FOREIGN PATENT DOCUMENTS

DE          69108321 T2 *   8/1990

\* cited by examiner

*Primary Examiner* — Joseph W Becker
(74) *Attorney, Agent, or Firm* — Banner & Witcoff, Ltd.

(57) ABSTRACT

Certain configurations are described herein of a fluid handling apparatus that comprises a projector configured to provide an image of labware onto a support. The provided image can be used to assist a user in proper placement of the labware onto the support. The system can be configured to determine if the labware has been properly placed prior to beginning any fluid handling operations.

18 Claims, 13 Drawing Sheets

SYSTEMS AND METHODS FOR FACILITATING PLACEMENT OF LABWARE COMPONENTS

PRIORITY APPLICATION

This application is a continuation of U.S. application Ser. No. 14/958,130, filed on Dec. 3, 2015, which claims priority to and the benefit of U.S. Provisional Application No. 62/087,550 filed on Dec. 4, 2014, the entire disclosures of the aforementioned applications are hereby incorporated herein by reference.

TECHNOLOGICAL FIELD

This application is related to systems and methods for facilitating placement of labware components. In certain configurations, the system may comprise a projector configured to provide a virtual image of at least one labware component onto a support to assist in placing the labware component at a labware site of the support.

BACKGROUND

Labware components such as fluid containers, tips, etc. can be used in many different analyses.

SUMMARY

In one aspect, a fluid handling system comprising a support configured to receive at least one labware components at a labware site on the support, and a projector configured to provide an image of the at least one labware component onto the support to assist in placing the at least one labware component at the labware site is provided.

In certain embodiments, the projector is positioned above the support. In other embodiments, the projector is configured to provide a second image of a second labware component onto the support. In some examples, the projector is positioned below the support. In some instances, the projector is configured to project the image that is less than the entire labware component. In other embodiments, the support is configured to receive a microwell plate comprising a plurality of individual wells and in which the projector is configured to project an image of the microwell plate that is less than an entire image of the microwell plate. In certain examples, the support is configured to receive a microwell plate comprising a plurality of individual wells and in which the projector is configured to project an image of the microwell plate that is an entire image of the microwell plate. In some examples, the projector is configured to project the image using visible light. In certain embodiments, the projector is configured to project the image using non-visible light. In other embodiments, the projector comprises a DLP chip and a light source. In some examples, the projector comprises a liquid crystal panel and a light source. In certain examples, the fluid handling system comprises a common light source that is used as a light source of the projector and as a light source of a detector of the fluid handling system. In some embodiments, the light source comprises a lamp, a light emitting diode, a laser or other light sources. In other configurations, the projector is further configured to project user instructions. In some embodiments, the system further comprises at least one camera. In certain instances, the system comprises a processor configured to determine if the labware component is properly placed on the support from one or more pixels received by the camera. In other embodiments, the image of the labware component provided by the projector is at least 5% smaller than the labware component. In further examples, the support comprises a reflective material. In some instances, the support comprises a material effective to diffuse light received from the projector. In certain examples, the system comprises a second projector configured to provide an image different from the image of the labware component.

In an additional aspect, an instrument configured to receive a labware component is described. In certain configurations, the instrument comprises a projector configured to provide an image of at least some portion of a labware component at a site of the instrument configured to receive the labware component, in which the provided image is configured to assist positioning of the labware component at the site of the instrument.

In certain embodiments, the image represents the entire labware component. In some embodiments, the projector is positioned above, below or to a side of the site of the instrument configured to receive the labware component. In other embodiments, the projector is further configured to provide user instructions outside of a housing of the instrument. In some configurations, the projector is configured to provide the image continuously. In certain embodiments, the projector is configured to provide the image only until proper placement of the labware component has been determined. In some embodiments, the projector is configured to project the image using visible light. In certain examples, the projector is configured to project the image using non-visible light. In some embodiments, the projector comprises a DLP chip and a light source. In certain instances, the instrument comprises a common light source that is used as a light source of the projector and as a light source of a detector of the instrument. In other embodiments, the instrument comprises a camera. In some examples, the camera is configured to receive at least one pixel representative of the labware component and compare the position of the received pixel to a pixel position of the image to determine if the labware component has been properly placed. In certain examples, the camera is positioned above, below or beside the support. In other examples, the camera and the projector are positioned adjacent to each other. In some embodiments, the camera and the projector are positioned opposite of each other. In certain configurations, the camera is configured to receive at least two different pixels representative of the labware component and compare the position of the received two different pixels to a first pixel position of the image and to a second pixel position of the image to determine if the labware component has been properly placed. In some configurations, the camera is configured to receive a pixel from a positioning indicator on the support. In other embodiments, the projector is configured to provide a second image different from the image of the labware component. In some instances, the image is projected intermittently. In other embodiments, the instrument comprises a detector.

In another aspect, a fluid handling system comprising a support configured to receive at least one labware component at a labware site on the support is disclosed. In certain configurations, the support comprises an integral projector configured to provide an image of the at least one labware component onto the support to assist in placing the labware component at the labware site.

In certain embodiments, the projector is positioned at a top surface of the support. In other embodiments, the projector is positioned at a bottom surface of the support. In some examples, the projector is positioned centrally within the support. In other examples, the projector is configured to project the image that is less than the entire labware component. In some embodiments, the support is configured to receive a microwell plate comprising a plurality of individual wells and in which the projector is configured to project an image of the microwell plate that is less than an entire image of the microwell plate. In other embodiments, the support is configured to receive a microwell plate comprising a plurality of individual wells and in which the projector is configured to project an image of the microwell plate that is an entire image of the microwell plate. In certain examples, the projector is configured to project the image using visible light. In other examples, the projector is configured to project the image using non-visible light. In some embodiments, the projector comprises a DLP chip and a light source. In some examples, the projector comprises a liquid crystal panel and a light source. In other embodiments, the fluid handling system comprises a common light source that is used as a light source of the projector and as a light source of a detector of the fluid handling system. In certain examples, the light source comprises a lamp, a light emitting diode, a laser, or a device that emits light. In some configurations, the projector is configured to project user instructions. In certain examples, the system comprises at least one camera. In other examples, the system comprises a processor configured to determine if the labware component is properly placed on the support from one or more pixels received by the camera. In certain embodiments, the image of the labware component provided by the projector is at least 5% smaller than the labware component. In other embodiments, the support comprises a reflective material. In further embodiments, the support comprises a material effective to diffuse light received from the projector. In certain examples, the system comprises a second projector in the support, the second projector configured to project an image different from the image of the labware component.

In another aspect, a fluid handing instrument comprising a support configured to receive at least one labware component at a labware site on the support, a projector configured to provide an image of the at least labware component onto the support to assist in placing the at least labware component at the labware site, and a sampling probe configured to provide at least one fluid to the labware component is described.

In certain embodiments, the projector is integral to the sampling probe. In some embodiments, the projector is positioned above the support or below the support. In certain examples, the projector is configured to provide a second image of another labware component onto the support. In some embodiments, the projector is configured to provide an image that is less than the entire labware component. In certain configurations, the support is configured to receive a microwell plate comprising a plurality of individual wells and in which the projector is configured to project an image of the microwell plate that is less than an entire image of the microwell plate. In other embodiments, the support is configured to receive a microwell plate comprising a plurality of individual wells and in which the projector is configured to project an image of the microwell plate that is an entire image of the microwell plate. In some examples, the projector is configured to project the image using visible light. In other examples, the projector is configured to project the image using non-visible light. In some embodiments, the projector comprises a DLP chip and a light source. In certain examples, the projector comprises a liquid crystal panel and a light source. In some embodiments, the fluid handling system comprises a common light source that is used as a light source of the projector and as a light source of a detector of the fluid handling system. In certain embodiments, the light source comprises a lamp, a light emitting diode, a laser, or a device that emits light. In some examples, the projector is further configured to project user instructions. In certain examples, the system comprises at least one camera. In other examples, the system comprises a processor configured to determine if the labware component is properly placed on the support from one or more pixels received by the camera. In some embodiments, the camera is integral to the sampling probe. In additional instances, the support comprises a reflective material. In some embodiments, the support comprises a material effective to diffuse light received from the projector. In other embodiments, the system comprises a second projector configured to project an image different from the image of the fluid receptacle from the projector.

In another aspect, a method of assisting in placement of a labware component at a labware site on a support of a fluid handling system comprising projecting an image of some portion of the labware component onto the support is provided.

In certain examples, the method comprises projecting an entire image of the labware component onto the support. In other examples, the method comprises projecting user instructions. In some embodiments, the method comprises determining if the labware component has been placed at a proper labware site. In additional embodiments, the method comprises projecting the image from above the support. In certain examples, the method comprises projecting from below the support. In some examples, the method comprises projecting from a side of the support. In further examples, the method comprises using a processor to compare the projected image and a position of a placed labware component on the support prior to analysis using the labware component. In some embodiments, the method comprises projecting a second image different from the projected image. In certain examples, the method comprises projecting the image and the second image from a single projector or from two different projectors.

In an additional aspect, a method of assisting in placement of a labware component at a labware site on a support of a fluid handling system comprising projecting an image of some portion of the labware component onto the support is disclosed.

In certain embodiments, the method comprises projecting an entire image of the labware component onto the support. In some embodiments, the method comprises projecting user instructions. In other embodiments, the method comprises determining if the labware component has been placed at a proper labware site. In some examples, the method comprises projecting the image from above the support. In other examples, the method comprises projecting from below the support. In some embodiments, the method comprises projecting from a side of the support. In certain examples, the method comprises using a processor to compare the projected image and a position of a placed labware component on the support prior to analysis using the labware component. In some embodiments, the method comprises projecting a second image different from the projected image. In additional embodiments, the method comprises projecting the image and the second image from a single projector or from two different projectors.

In another aspect, a method of assisting in placement of a labware component at a site on a support of a fluid handling system comprising providing a fluid handling system comprising a projector configured to provide an image of some portion of the labware component onto the support is described.

In certain embodiments, the method comprises one or more of providing the support, providing an image of the some portion of the labware component, providing an image of user instructions, or providing the image of the user instructions in a space other than the support. In other embodiments, the image of the labware component provided onto the support and the image of the user instructions are simultaneously provided. In certain examples, the method comprises providing a lens. In other examples, the method comprises providing a camera. In some embodiments, the method comprises configuring the system to determine if the labware component has been properly placed by comparing the image and placement of the labware component. In certain configurations, the method comprises providing a detector.

In an additional aspect, a method of facilitating analysis of a fluid in a fluid receptacle comprising providing a projector configured to provide an image of at least one labware component onto a support to assist in placing the at least labware component at a labware site of the support, and providing instructions for using the projector with a fluid handling system comprising the support is disclosed.

In certain embodiments, the method comprises one or more of providing the support, providing an image of the some portion of the labware component, providing an image of user instructions, or providing the image of the user instructions in a space other than the support. In some examples, the image of the labware component provided onto the support and the image of the user instructions are simultaneously provided. In certain examples, the method comprises providing a lens. In other instances, the method comprises providing a camera. In further embodiments, the method comprises configuring the system to determine if the labware component has been properly placed by comparing the image and placement of the labware component. In some examples, the method comprises providing a detector.

In another aspect, a method of handling fluids for analysis comprising providing a virtual image of a labware component onto a support of a fluid handling system is described.

In certain embodiments, the method comprises determining if a labware component receptacle placed onto the support is substantially aligned with the projected image. In some embodiments, the determining step is performed using a camera that is configured to receive at least one pixel representative of the position of the placed labware component on the support and using a processor to compare the received pixel with a pixel position of the projected image. In certain configurations, the method comprises configuring the labware component as a fluid device comprising a plurality of fluid receptacles and illuminating one or more individual receptacles of the fluid receptacle using the same device used to provide the virtual image. In some examples, the method comprises providing the virtual image using a projector. In other examples, the method comprises configuring the projector with a DLP chip and a light source. In some embodiments, the method comprises providing a second virtual image, different from the virtual image, onto the support. In certain examples, the method comprises configuring the provided virtual image to be less than 50% of a size of the labware component. In some configurations, the method comprises configuring the provided virtual image to comprise substantially the same x-y dimensions as x-y dimensions of the labware component. In certain embodiments, the method comprises discontinuing providing of the virtual image after proper placement of the labware component is determined. In some examples, the method comprises determining the type of support present in the fluid handling system.

Other aspects, embodiments, examples and configurations are described in more detail herein.

BRIEF DESCRIPTION OF THE SEVERAL VIEWS OF THE DRAWINGS

Certain specific aspects, embodiments and configurations are described with reference to the accompanying figures in which.

Figure 1A:
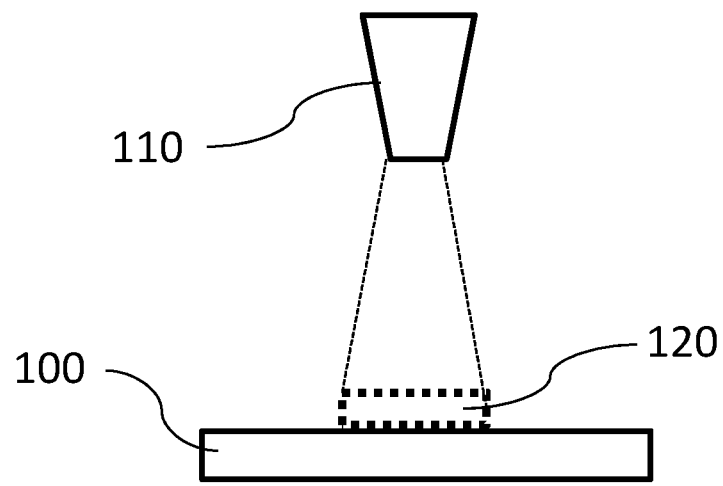
FIGS. 1A-1C are illustrations showing a support and a projector, in accordance with certain examples.

It will be recognized by the person of ordinary skill in the art, given the benefit of this disclosure, that the particular shapes and dimensions in the figures are provided for illustration purposes only. Many different labware images, support sizes and shapes, projector configurations and camera configurations can be used in the systems, devices and methods described herein.

DETAILED DESCRIPTION

Certain configurations of systems, devices and methods are described herein that use or place labware or labware components. The terms "labware" and "labware components" are used interchangeably. In some instances, the labware component may be any component that is placed on a support or deck of a fluid handling system. For example, the labware component may be a microwell/microtiter plate, a shaker, a flask, a riser to elevate the microtiter plate, a wash bowl, a tip box with various size and color of tips, other types of sample receptacles, a waste shoot, and many other types of specialized components that can be used in one or more fluid handling operations or within an analytical instrument. Illustrative labware or labware components that can be used are those components commonly used with fluid handling systems commercially available from PerkinElmer Health Sciences, Inc. (Waltham, MA).

In certain configurations, the use of a virtual image to assist in placement of labware components permits the system to alter the position of the labware components. For example, if a sticker or fixed image were placed on the support, the position of the sticker is generally not changeable. This fixed position may limit the type of fluid handling operations that can be performed. In some instances, the support or deck used herein is an "imageless" or "image free" support that does not include any stickers or permanent images of the labware components. The provision of virtual images by the projector onto an image free support permits movement of the labware component images to any position of the support, permits the use of a larger number of images than might be possible using stickers and/or increases the overall flexibility of the fluid handling systems and instruments.

In certain instances, the systems described herein may include or use at least one projector to provide an image (or portion thereof) of labware to be placed on the system. For example, the system may include a projector that can provide an image of the labware at a site on a support or deck where the labware is to be placed. A user can view the image and place the labware so that the image and the placed labware substantially overlap. If desired, the system can determine if the labware placement is proper and discontinue the image or the image may be present during fluid analysis. While certain embodiments make reference to the term "projector," an entire projector need not be present in the systems, devices and methods described herein. Instead, the term "projector" is intended to mean that certain components of a projector, e.g., a processing chip, light source, optional lenses, etc. may be present to provide an image. The projector need not have its own dedicated power source or controls but instead may use the controller and/or power supply from the fluid handling system or instrument. In some instances, the projector may comprise a light processor, e.g., DLP chip or LCD panels, and a light source. In other instances, one or more lenses may be present to focus the image to a desired place and/or size. In other configurations, the light source used for detection by the system may also be used as a light source for the projector, whereas in other configurations the projector may comprise its own dedicated light source. Illustrations of projectors that are present in the systems, device and methods are described in more detail herein.

Figure 1B:
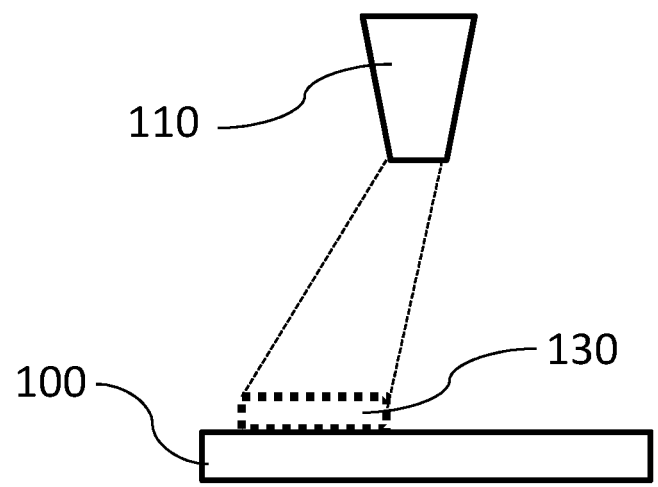
Figure 1C:
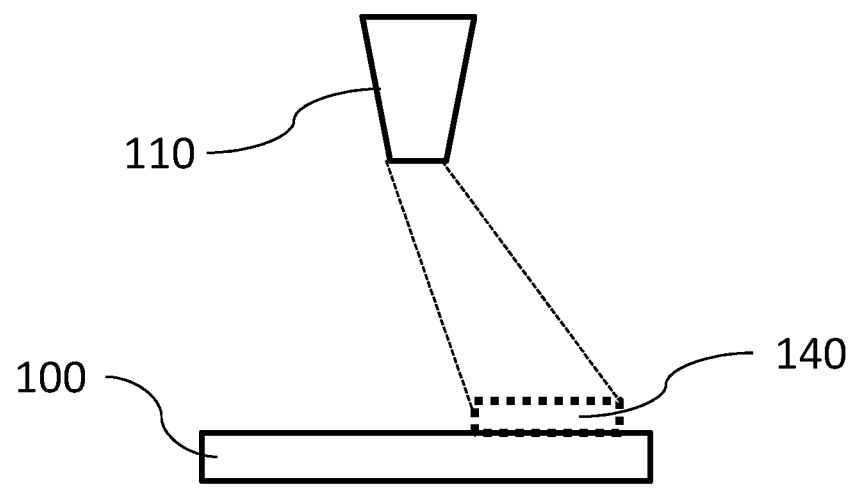

In certain embodiments and referring to FIG. 1A, a support 100 is shown that comprises a generally rectangular deck that is configured to receive one or more labware components. While the deck is shown as rectangular, other shapes and configurations for the support 100 can also be used. A projector 110 is shown as being positioned above the support 100. The projector 110 provides a virtual image 120 of labware, e.g., a microtiter plate, onto the support 100. In the illustration of FIG. 1A, the virtual image 120 is provided in about the center of the support 100 from the projector 110. The central positioning of the image 120 on the support 100 is not required. For example, the projector 110 may comprise lens shifting capabilities to permit the projector 120 and the support 100 to remain stationary while adjusting the exact position of the virtual image on the support. The lens shifting capability permits the virtual image to be moved in both the x- and y-dimensions of the support (when viewed from above the support). For example and referring to FIG. 1B, the projector 120 and the support 110 can remain stationary, and a virtual image 130 can be provided by the projector 120 to one side of the support 100. If desired, the projector 120 can provide an image 140 (see FIG. 1C) on another side of the support 100 without the need to move the projector 110 or the support 100. The exact dimensions (x, y, and z dimensions) of the image can vary. In some instances, the virtual image provided to the support 100 is a generally "flat" image such that a user positioned next to the support will view a 2-dimensional image on the support. If desired, however, the image may have a height or depth by providing a 3-dimensional virtual image onto the support. For example, where the labware to be placed has a substantial height, e.g., test tubes, shakers, etc., it may be desirable to provide a 3-dimensional image such that a user viewing the support from the side can better visualize the labware placement site and orientation.

Figure 2:
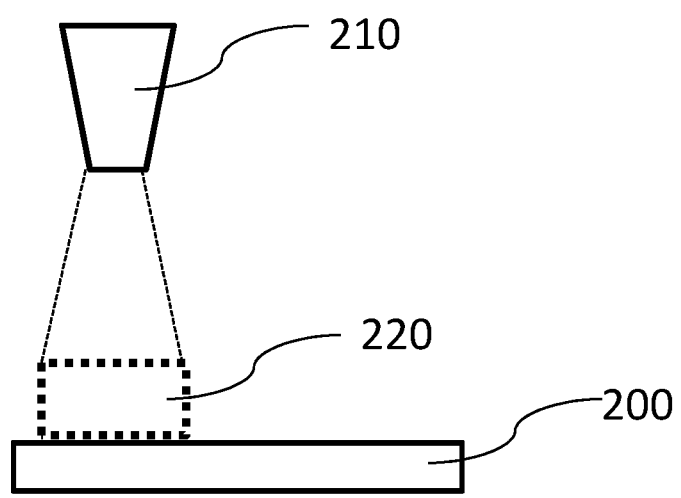
FIG. 2 is an illustration showing a projector offset from a support, in accordance with certain configurations.

In some embodiments, it may be desirable to move the projector or the support or both to provide a virtual image at a desired labware position on the support. Referring to FIG. 2, a support 200 is shown with a virtual image of labware 220, e.g., a tip box, provided on the support 200 from a projector 210. In the configuration shown in FIG. 2, the projector 210 is configured to move, e.g., in one, two or three dimensions, to provide the image 220 at a desired labware site and/or position on the support 200. If desired, however, the position of the support 200 could instead be altered with the position of the projector 210 remaining fixed during operation. In other instances, both the projector 210 and the support 200 can be moved to desired positions. The exact vertical distance between the projector 210 and the support 200 can vary, and in certain instances the spacing is sufficient to permit a user to place labware on the support 200, e.g., the spacing is selected to be at least large enough that placement of the labware does not contact the projector 210 once the labware is properly placed on the support 200. In certain configurations, one or both of the projector 210 or the support 200 can be moved after proper placement of the labware onto the support 200.

Figure 3:
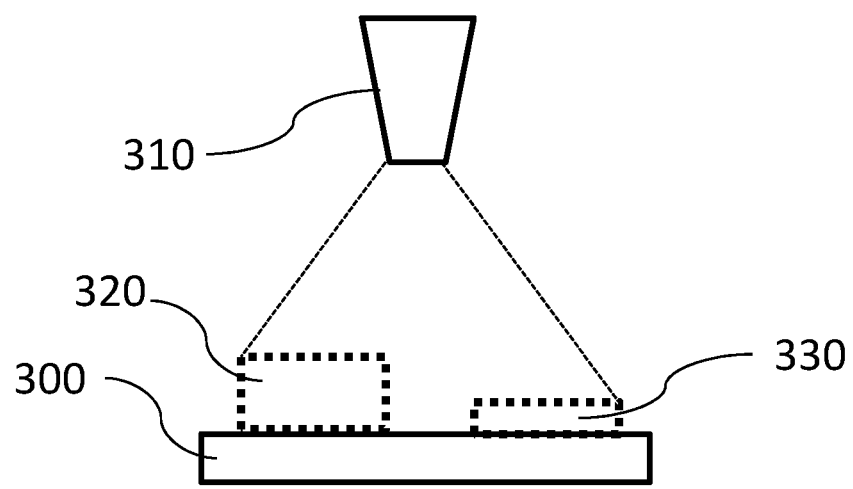
FIG. 3 is an illustration showing a projector providing two images to a support, in accordance with certain examples.

In certain embodiments, the systems described herein may comprise a projector that is configured to provide more than a single image. For example, the projector may provide a first image of a first type of labware and a second image of a second type of labware. The first and second types of labware may be the same or may be different. Referring to FIG. 3, a support 300 is shown that can receive one or more types of labware. A projector 310 is positioned above the support 300 and is configured to provide a first virtual image 320 and a second virtual image 330. The images 320, 330 may be part of a single image projected onto the support rather than two distinct and separate images. For example, a single image comprising a tip box as the virtual image 320 and a microtiter plate as the mage 330 can be provided from the projector 310. In other instances, each image can be provided by a respective projector, e.g., there may be two separate projectors present in the system. In additional configurations, the projector may alternate between images 320, 330. If desired, the frequency of alternating between the two images 320, 330 can be sufficiently high such that the images 320, 330 appear as continuous images to the user. As described in more detail herein, labware corresponding to each of the images 320, 330 can be placed on the support in the substantially same position as the virtual images 320, 330. The system can be designed to determine if proper placement of the labware has been achieved to ensure the appropriate labware is present at a desired site on the support 300. For example, if a user were to place the microtiter plate on top of the image 320 and place the tip box on top of the image 330, the system can be designed to detect the improper labware placement and not permit operations or analysis to proceed until proper labware placement is achieved.

Figure 4A:
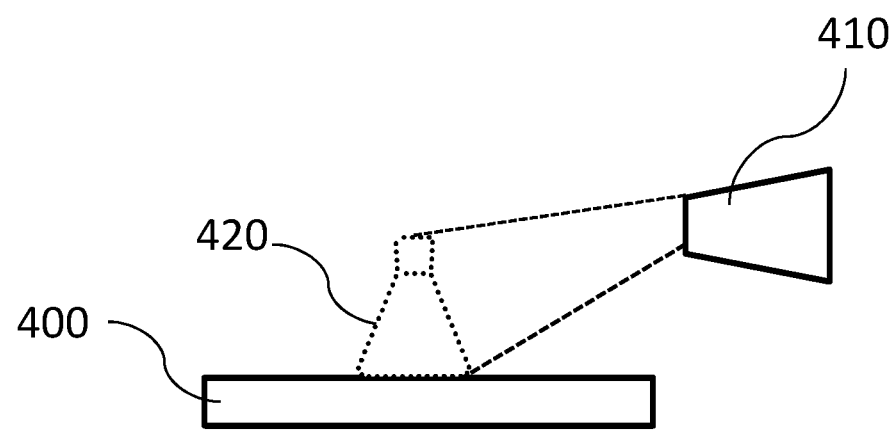
FIGS. 4A and 4B are illustrations showing a projector to the side of a support, in accordance with certain configurations.
Figure 4B:
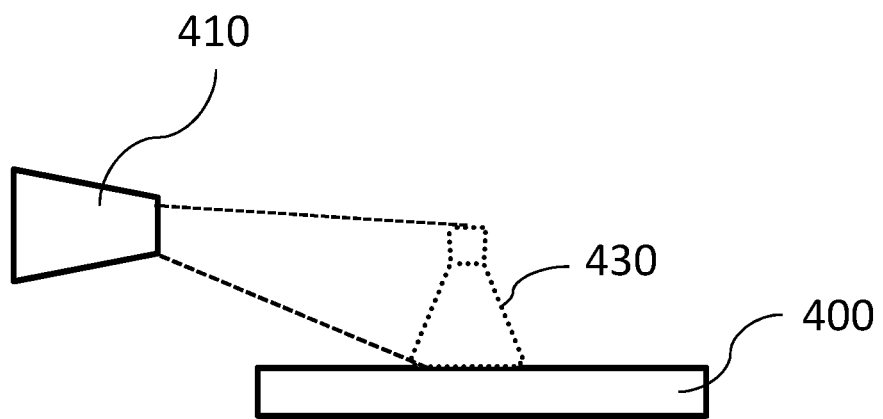
Figure 5:
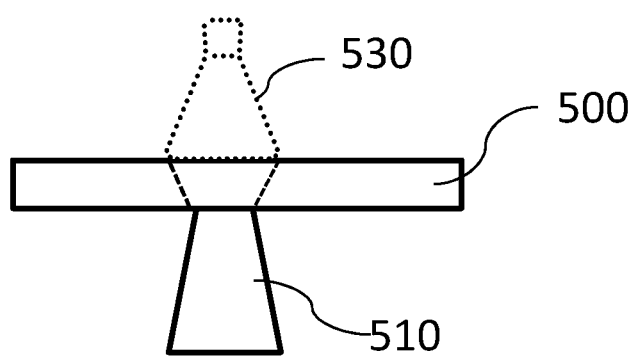
FIG. 5 is an illustration showing a projector below a support, in accordance with certain examples.
Figure 6:
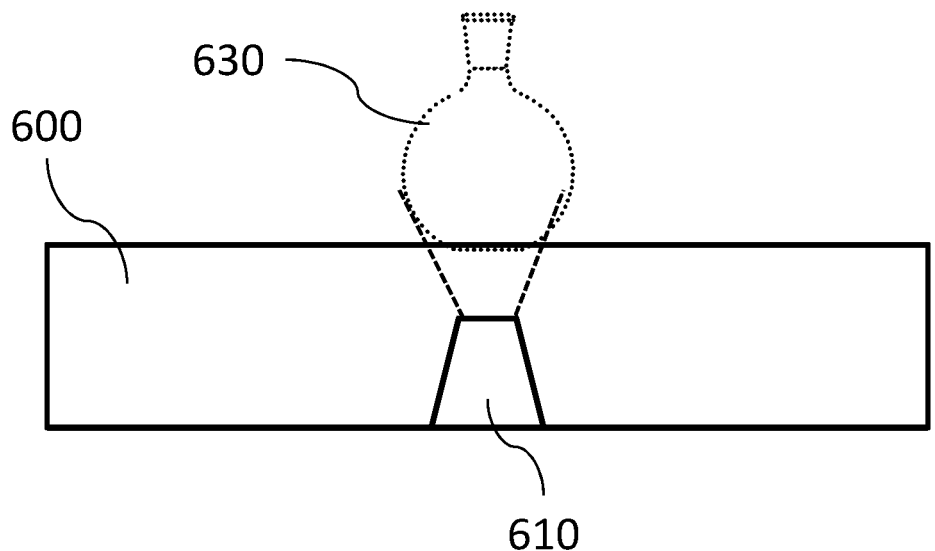
FIG. 6 is an illustration showing a projector within a support, in accordance with certain instances.

In certain embodiments, the projector used in the systems, devices and methods described herein need not be positioned above the support to provide a virtual image on the support. For example, keystone adjustment, lens shifting, image shadowing and other techniques can be used to permit projector placement below the support, within the support or to one side of the support. Various illustrations are shown in FIGS. 4A-6. Referring to FIG. 4A, a support 400 is shown that can receive an image 420 from a projector 410 placed to one side of the support 400. The projector 400 need not be positioned to the right side of the support but can instead be positioned to the left side of the support 400 (see image 430 in FIG. 4B) when the support is viewed from the front or back. In the illustrations of FIGS. 4A and 4B, the labware is shown as a shaker flask though other types of labware can also be used. Referring to FIG. 5, a support 500 is shown with a projector 510 positioned underneath the support 500. The support 500 is configured to be optically transparent (at least to some degree) to permit the image 530 from the projector 520 to pass through the support 500. In some instances, the image 530 may be "flat" such that when a user looks down onto the support, the labware image will be present, e.g., an image of the bottom of the shaker flask would be present and may optionally include the text "shaker flask" to prompt the user to place the shaker flask on that spot. To project an image onto the support 500, similar configurations as those used with rear projecting televisions can be used. In other instances, one or more lenses or mirrors can be placed above the support 500 to reflect the image 530 from the projector 510 back onto the support, or the support 500 can include one or more coatings to assist in creation of the virtual image 530 above the support 500. Referring to FIG. 6, a support 600 comprising an integral projector 610 is shown. The projector 610 provides a virtual image 630 of labware on the support 600. In this illustration, the labware image 630 is of a flat round bottom flask. As noted in connection with FIG. 5, one or more lenses or mirrors can be placed above the support 600 to reflect the image 630 from the projector 610 back onto the support, or the support 600 can include one or more coatings to assist in creation of the virtual image 630 above the support 600. Alternatively, the projector 610 may be configured similar to rear projecting televisions to provide the image 630 on the support 600. The positioning of the projectors 510 and 610 need not be central as shown in FIGS. 5 and 6. Instead, the projector can be positioned anywhere under or within the support and provide a labware image onto the support.

Figure 7A:
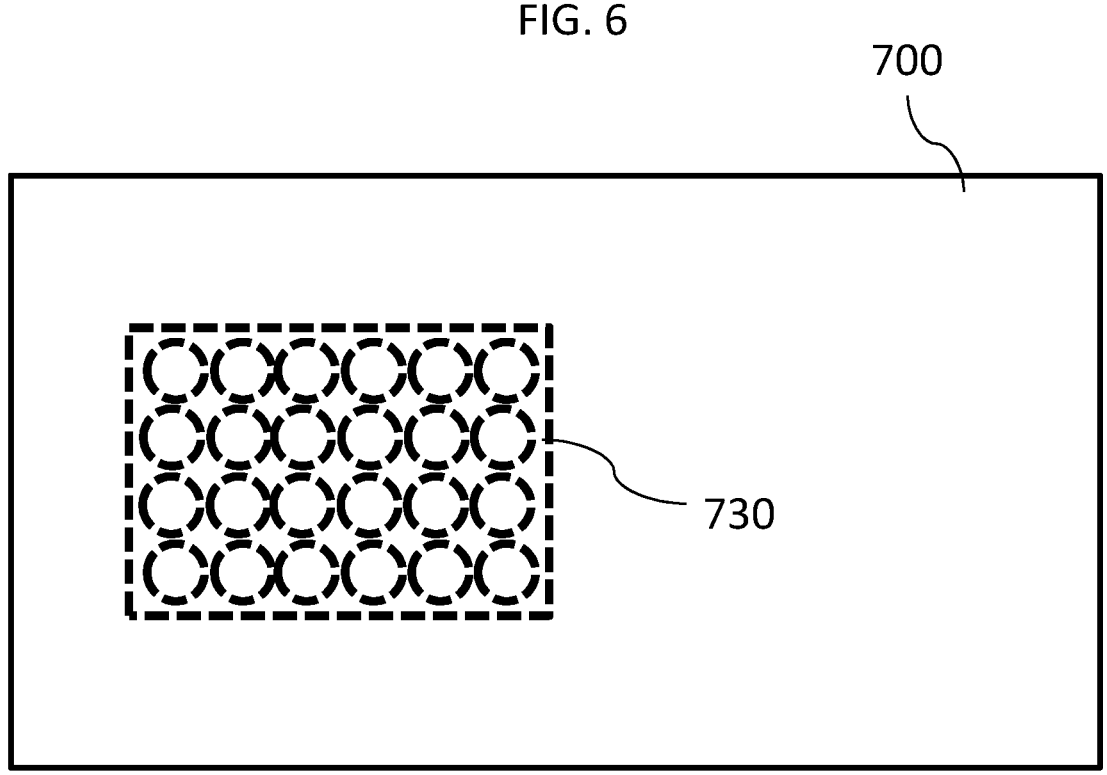
FIG. 7A is an illustration showing an image of labware on a support, in accordance with certain examples.
Figure 7B:
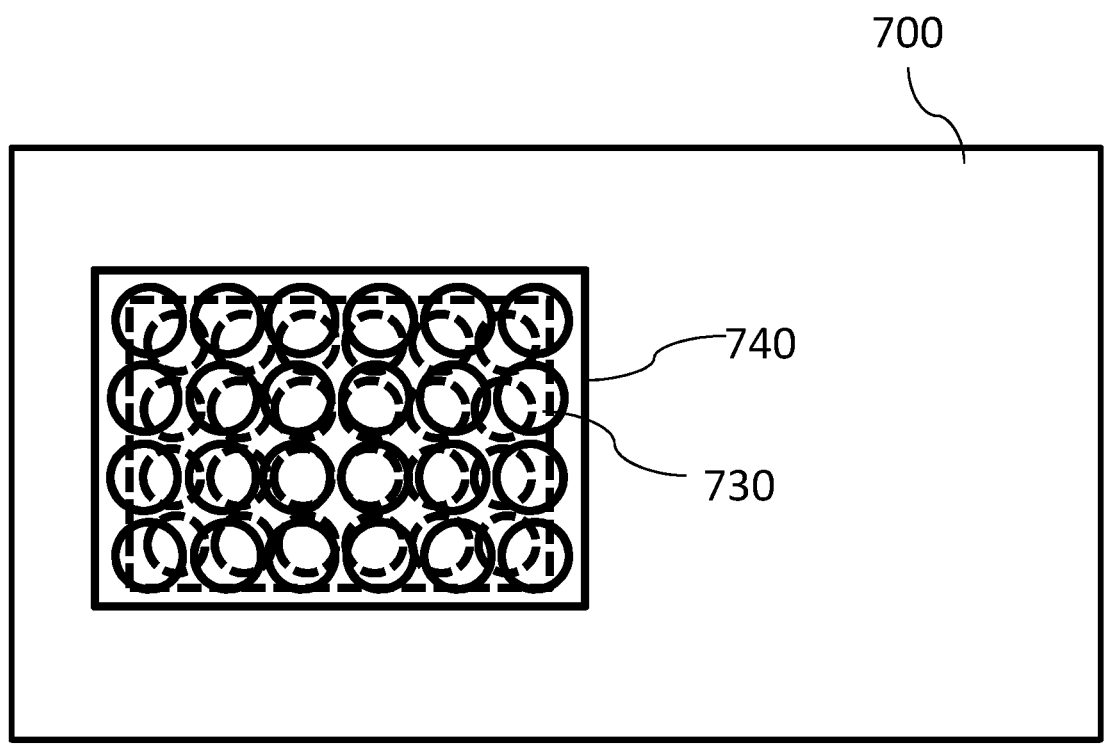
FIG. 7B is an illustration showing proper placement of labware (a microwell plate) on a labware image, in accordance with certain embodiments.
Figure 7C:
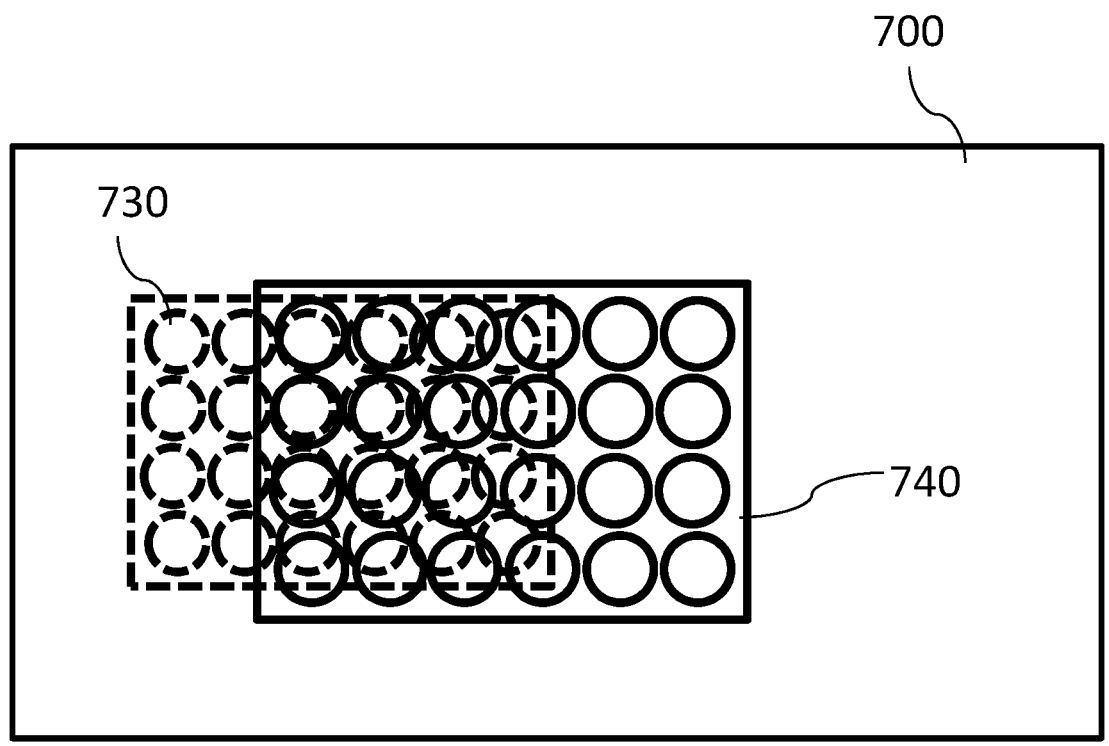
FIG. 7C is an illustration showing improper placement of labware (a microwell plate) on a labware image, in accordance with certain examples.

In some instances, the projectors described herein can be configured to provide an image whose dimensions are different from the dimensions of the labware to be placed on the support. For example, the x-y dimensions of the image (when viewed from above the support) can be different than the x-y dimensions of the labware to be placed at the labware site on the support. Referring to FIG. 7A, a top view of a support 700 is shown. A projector (not shown) provides an image 730 of labware onto the support 700. In this illustration the labware image 730 takes the form of a 24-well microtiter plate. The x-y dimensions of the image 730 are smaller such that placement of an actual 24-well microtiter plate 740 (see FIG. 7B) results in the image appearing on top of the placed 24-well microtiter plate. For example, the image 730 can be sized and arranged such that projection of the entire image 730 onto the plate 740 provides visual feedback to a user that the plate 740 has been properly positioned. Referring to FIG. 7C, a representation is shown where the user has incorrectly placed the labware 740 onto the support 700, which results in the image 730 still being visible on the support 700 and beside the plate 740. The system would not permit analysis to proceed until the user adjusts the position of the labware 740 in a manner shown in FIG. 7B.

Figure 8A:
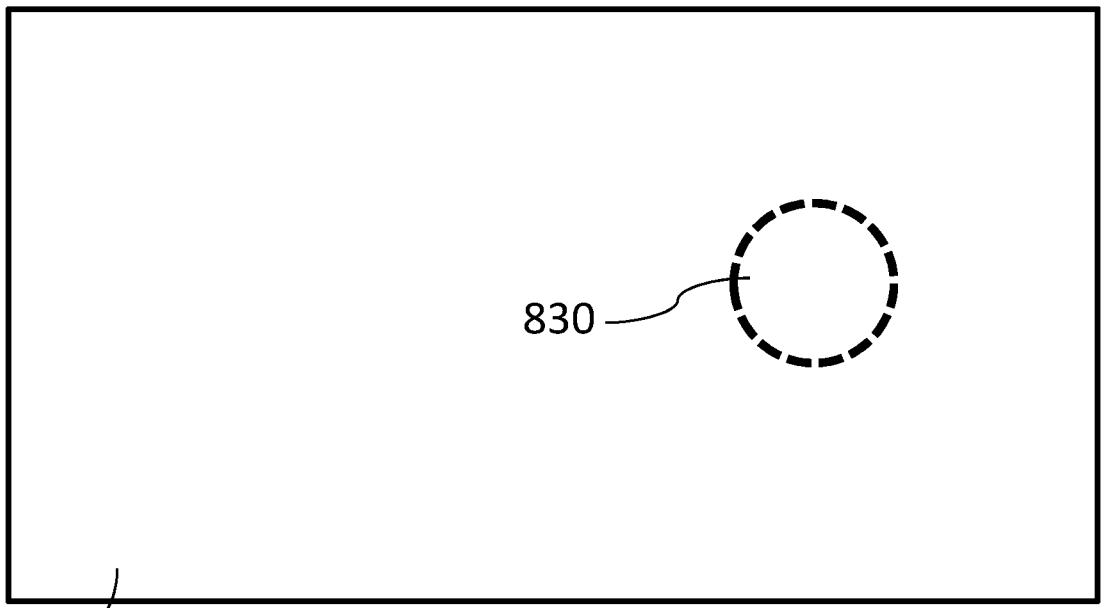
FIGS. 8A-8C show an image and proper placement (FIG. 8B) and improper placement (FIG. 8C) of labware within the image, in accordance with certain configurations.
Figure 8B:
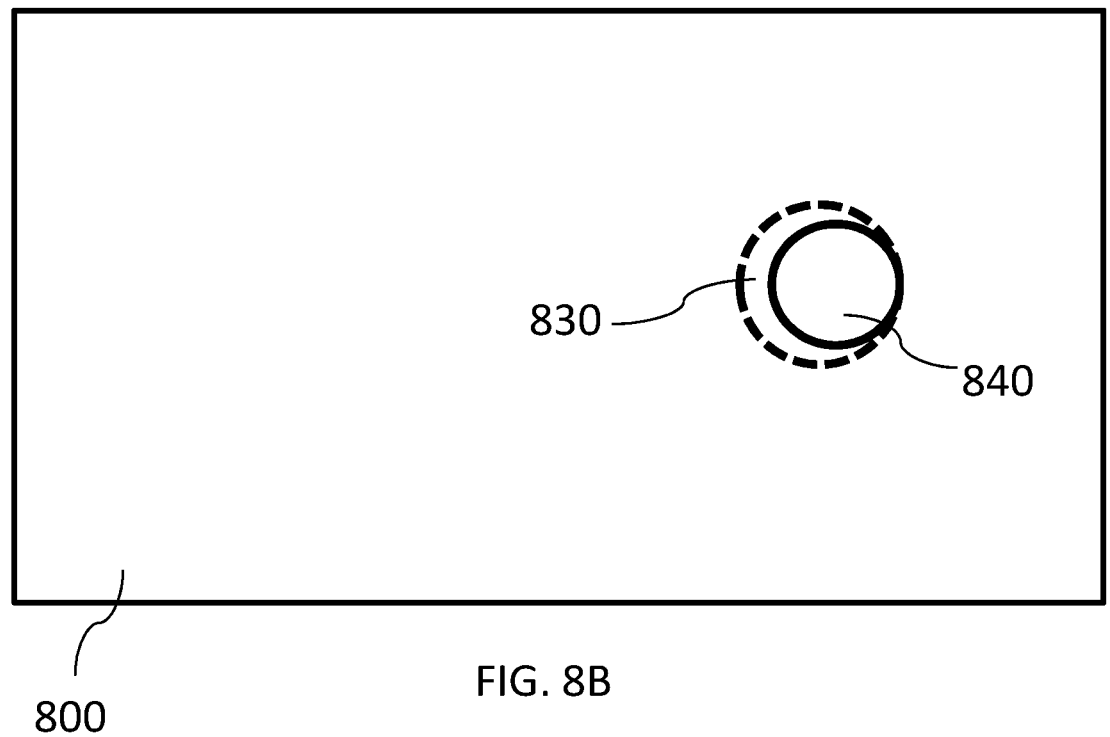
Figure 8C:
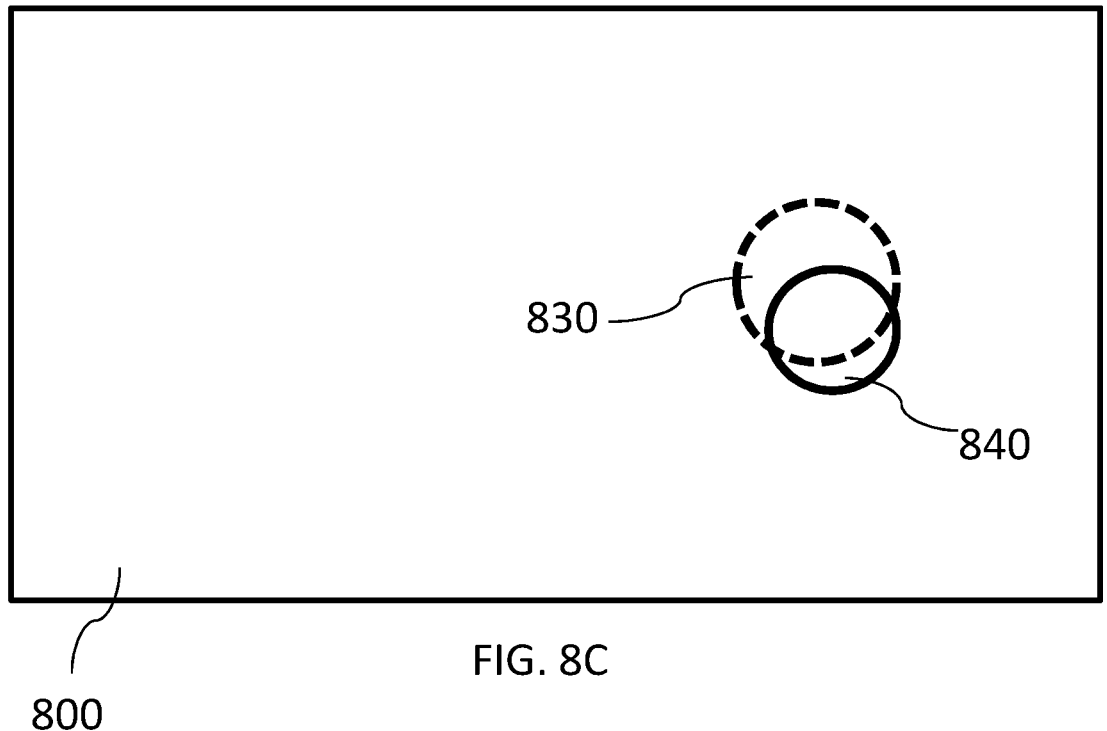

Referring now to FIG. 8A, a support 800 is shown with a labware image 830 from a projector (not shown). In this illustration, the labware image 830 represents the base of a shaker flask. The image is sized such that it is larger than the flask to be placed on the image 830. If a user places the base of the flask within the image 830 (see flask 840 in FIG. 8B), then analysis will be permitted to proceed. If the base of the flask 840 is positioned outside of the image 830 (see FIG. 8C), then analysis will not be permitted to proceed. While not shown in FIGS. 7A-8C, if desired, the provided image can be about the same dimensions, e.g., within about 5% of the labware to be placed on the support. By sizing the image to be about the same dimensions as the labware to be placed on the support, increased placement precision can be achieved and many different items can be simultaneously placed on the support in close proximity. In some instances, the support 800 may comprise holes or other locating indicia where pins from the labware or labware holder make the final precision placement.

In certain embodiments, the projectors used in the systems, devices and methods described herein can be configured to provide an image using visible light, e.g., light with a wavelength of about 390 nm to about 700 nm. Where the projector is configured to provide two or more images, the wavelength of light used for different images can be the same or can be different. For example, one labware image may be orange and another labware image may be blue or both labware images can be orange. To provide user recognition, it may be desirable to color code different labware components with different colors that match the image color provided by the projector. For example, where a blue image is provided for a microtiter plate, a blue dot may be present on the microtiter plate to prompt the user to look for the blue image. Where a red image is used for a shaker flask, a red dot may be present on the shaker flask to prompt the user to look for the red image. In some instances, similar labware components with different sizes can correspond to color-coded images. For example, a 24-well microtiter plate image may be red. A 96 well microtiter plate image can be orange. A 384 well microtiter plate image can be yellow. By color coding different sized labware components with different colors, there is a lower likelihood that a user will place the incorrectly sized labware component on the support.

In other instances, the wavelength of the visible light can be changed once proper placement of the labware on the site has been achieved. For example, a labware image can initially be red prior to placement of the labware onto the support at the labware site. After proper placement is achieved, the color of the image may be switched to green to provide the user visual feedback that proper placement has been achieved. Alternatively, the labware can be designed with materials to absorb the light of the image after proper placement has been achieved to provide feedback based on the disappearance of the virtual image. In other instances, the labware may include one or more materials such that proper placement of the labware cause the entire labware component to appear a different color. For example, the labware may initially be clear, and proper placement of the labware at the labware site may result in the labware turning a selected color based on the overlap of the labware and the provided image. If areas of the labware are outside of the image, then those areas would not appear with the proper color. The position of the labware can then be adjusted so that all areas of the labware component include the proper color.

In certain configurations, the light provided by the projector may be monochromatic, e.g., a single color or wavelength. For example, where a user is green color blind (e.g., has deuteranopia), the system can provide all images in a color other than green. Where the user is red color-blind (e.g., has protanopia), the system can provide images in a color other than red. Where a user is blue color blind (e.g., has tritanopia), the system can provide images in a color other than blue. In use of the system, one or more prompts may permit the user to select if they are color blind or permit the user to select the particular image color to be a single color or other colors selected by the user.

In some instances, the projector may also be configured to provide images using non-visible light, e.g., infrared light or other wavelengths not normally visible with the human eye. For example, the projector can provide images of labware or user instructions in non-visible wavelengths. The user may view the images through the use of specialized eyewear that is sensitive to such wavelengths. In other instances, the images can be provided using non-visible light which may become visible upon interference with the labware components. For example, placement of the labware component onto the support may result in the infrared light being incident on the labware component and a resulting appearance of the image. In other configurations, non-visible light may be used by the system for purposes other than placement of labware. For example, non-visible light may be used in calibration routines, in determining the boundaries of the support or in other methods or processes used by the fluid handling system or instrument.

In certain instances, the projector used in the systems and devices described herein may comprise a light source, a light processor and optionally one or more mirrors, lenses, etc. to focus the image and/or adjust the image position and size on the support. In some instances, the light processor may take the form of one or more liquid crystal display (LCD) panels, a digital light processor (DLP) chip or other suitable light processors. The projector may include one or more dichroic mirrors configured to reflect specific wavelengths of light from the light source. Where the projector is configured as a LCD projector, a light source can be configured to emit a plurality of light wavelengths. The emitted light may be incident on one or more mirrors, e.g., a dichroic mirror or a regular mirror or both. The mirrors may reflect all the light at a desired angle or may only reflect certain light wavelengths at a certain angle. In some instances, the dichroic mirrors can be configured to reflect a single beam of red, green or blue light. The reflected light may be provided to one or more a liquid crystal panels or screens, e.g., 3 LCD screens. Light provided from the liquid crystal panels can be recombined using a beam combiner, e.g., a dichroic prism, to form a single image that is provided to the support. The image may pass through one or more lenses to adjust the image throw distance, size and/or dimensions. Where the projector is configured as a digital light processor (DLP) projector, an optical semiconductor chip, also known as a digital micromirror device, uses a plurality of mirrors to reflect light. The number of mirrors on the chip may exceed two million in some instances. The mirrors are constructed and arranged in a matrix with each mirror representing a single pixel of the array. The chip typically also includes a cooling device, e.g., heat sink or Peltier cooler, and an optical window that allows light to pass from the mirrors. Each of the mirrors of the chip can tilt toward and away from a light source by a selected number of degrees and at a selected frequency, e.g., 5000 Hz or more. White light from a light source is provided to a spinning color wheel and onto the DLP chip. The color wheel filters the light into red, green and blue light. In an alternative configuration, the light source and color wheel can be replaced with light emitting diodes to provide the red, green and blue light to the mirror array. The position of the mirror in combination with the color of light provided to the mirror determines the color of the light which is reflected by the mirror. A DLP projector can include more than one DLP chip, e.g., 3 DLP chips, to provide increased numbers of colors.

In some embodiments, the resolution of the projector need not be high to provide a suitable image for viewing and assisting a user in placement of labware. In some instances, the resolution may comprise 480 horizontal lines or less. In other instances, the resolution may comprise 480-720 horizontal lines. In additional instances, the resolution may comprise 720-1080 horizontal lines. In further configurations, the resolution may comprise greater than 1080 horizontal lines, e.g., 2160, 3840 horizontal lines or other resolutions. In instances where the projector provides two or more images in close proximity to each other, it may be desirable to use an increased resolution to provide for finer detail in each image. The horizontal lines can be provided using interlaced, progressive or other methods. The number of frames per second may be less than 30, greater than 30 or even 60 or greater if desired. The exact brightness of the projector can vary depending on the use environment, and illustrative brightness values range from a few hundred lumens to about 1000 lumens, more particularly about 1000 lumens to about 2000 lumens, e.g., about 2000 lumens to about 2500 lumens.

In certain embodiments, the projector may comprise one or more inputs to couple the projector to another component of the system, e.g., to a database, video processor, image processor or other type of processor that can provide a digital image through the input. The input can take many forms including, but not limited to, USB, RGB, HDMI, DVI, RCA, component inputs or other inputs. In other instances, the projector can be electrically coupled to one or more memory units or databases which may comprise an image database comprising files of the various images to be provided. The images can be stored in many different types of graphic formats (both static and video files) including, but not limited to, jpg, gif, tiff, mov, mpeg, avi, bmp, png or other formats. The projector may also have access to other images by way of a wired or wireless connection to a remote database or mobile device comprising the images. In instances where a plurality of fluid handling systems are used in a common setting, a single image database may exist that can be accessed by each of the fluid handling systems by way of an intranet, wired network or wireless network. In other configurations, the images can be accessed wirelessly from a mobile device, e.g. a tablet, used to receive inputs to operate the fluid handling system.

Figure 9:
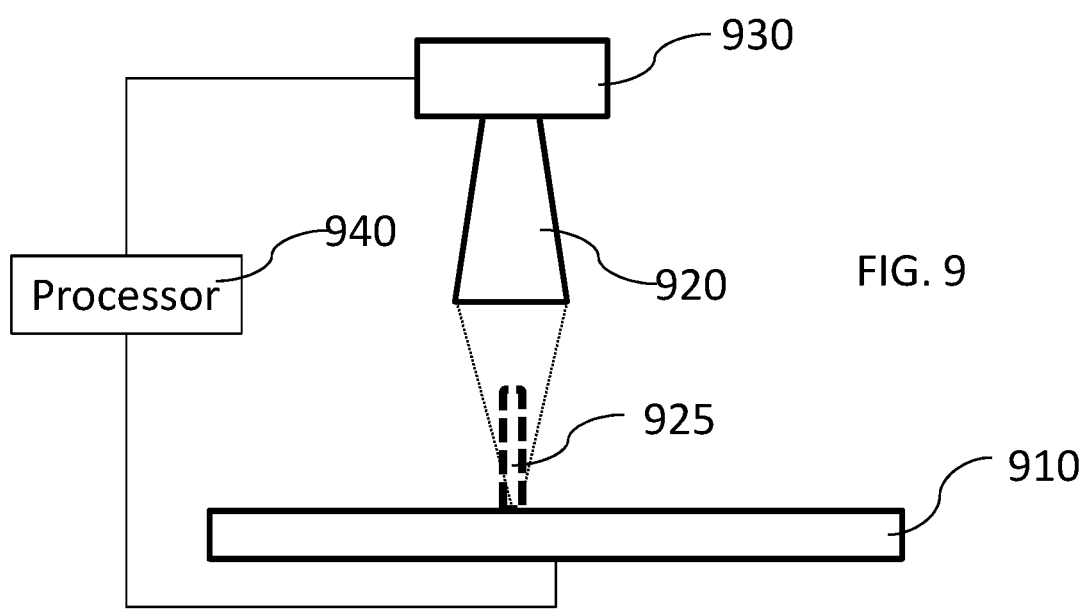
FIG. 9 is an illustration showing a processor electrically coupled to a projector, in accordance with certain examples.
Figure 10:
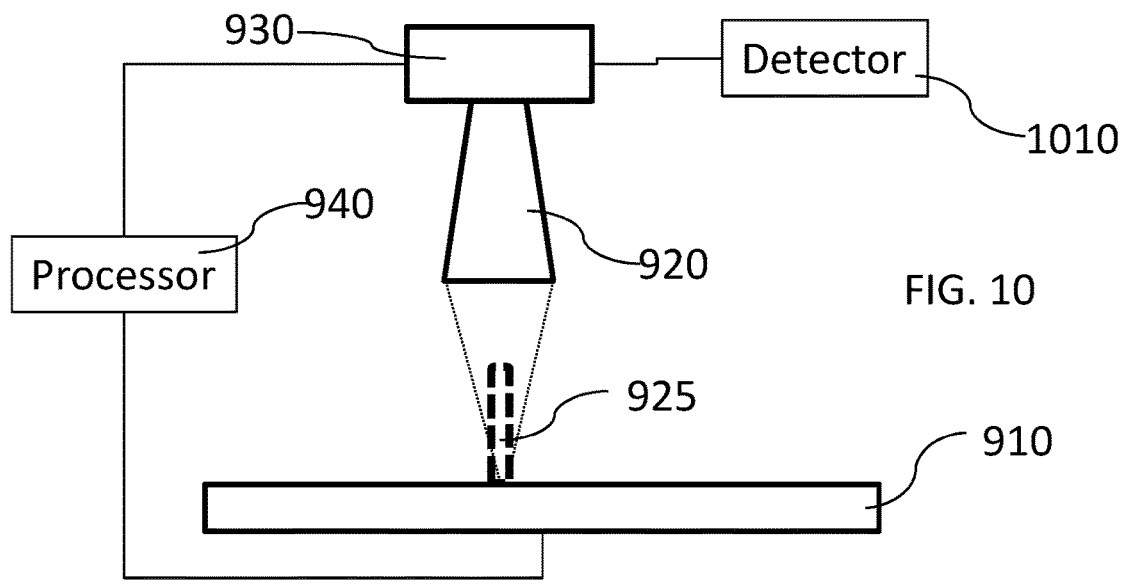
FIG. 10 is an illustration showing a common light source, in accordance with certain configurations.

In certain configurations and referring to FIG. 9, an illustration of a fluid handling system 900 is shown. The fluid handling system 900 comprises a support 910, a projector 920 and a light source 930 within the projector 920. The projector 920 is electrically coupled to a processor 940 that can also control the position of the support 910 and other components of the system 900. In some instances, the processor 940 can access an image database (not shown) to retrieve an image of the labware to be provided on the support 910. The digital image can be retrieved by the processor 940 and provided to the projector 920 where it is converted to a virtual image 925. In this illustration, the labware image 925 takes the form of a test tube image. In some instances, the light source 930 can be used both to provide the light for the image 925 to be projected by the projector 920 and as light for detection of species using a detector of the fluid handling system. For example, and referring to FIG. 10, a detector 1010 can be optically coupled (for at least some period) to the light source 930 to receive light from the light source 930. The light can be provided to a sample (not shown) and used for detection purposes. For example, light from the light source 930 can be provided to a monochromator of the detector 1010 to select one or more wavelengths of light. The selected light can then be incident on a sample to excite the sample. The amount of light absorbed by the sample or the amount of light emitted by the sample after excitation can be measured using suitable optics, e.g., gratings, a photomultiplier tube, etc. In this configuration, an existing light source of a detector in a fluid handling system can be configured to provide the light both to the detector and to the projector components. If desired, however, each of the projector 920 and the detector 1010 can include its own dedicated light source.

While LCD and DLP projectors are described, other light projections means, e.g., cathode ray tubes, liquid crystal over silicon, etc., can also be used to provide images to a support. In addition, the light source need not be limited to bulbs commonly used in LCD and DLP projectors. Instead, the light source may be lamps, hollow cathode ray lamps, light emitting diodes, diode arrays, a laser, a laser array or other light sources that can provide one or more wavelengths of light. In some instances, two or more light sources can be present to permit a wide wavelength range of light to be provided. For example, a first light source that can provide light in the visible range may be present along with a second light source that can provide light in the visible range or in the non-visible range, e.g., in the infrared or ultraviolet range.

Figure 11:
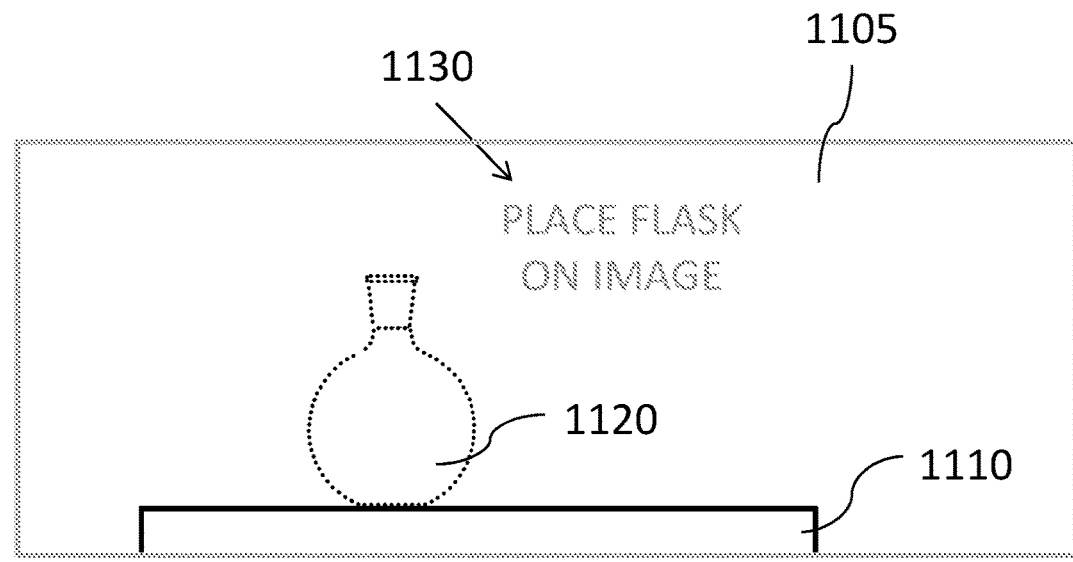
FIG. 11 is an illustration showing user instructions projected within an instrument housing, in accordance with certain examples.

In certain embodiments, the ability of the systems described herein to project virtual labware images onto a support permits a user to focus their attention on the support rather than having to move between a display screen and the support. To assist the user further, the projector may also be configured to project user instructions. These user instructions can be projected onto the support, on a surface on or within a housing of the fluid handling system, e.g., onto a back internal surface of the housing, onto a wall, the ceiling or other areas outside of the fluid handling system. In some instances, the user instructions can simultaneously be projected onto the support along with the labware image. In other configurations, the user instructions can be projected onto a screen or other portion of the instrument that can be seen by the user when the user is viewing the support. Referring to FIG. 11, a support 1110 is shown that comprises a virtual image 1120 of labware, e.g., a flask, projected from above and onto the support 1110. User instructions 1130 are projected onto a back surface 1105 of the instrument housing so that a user can see the instructions prior to placing the flask. If desired, the user instructions may flash on and off. In some instances, when the labware is placed properly, the user instructions may disappear to provide visual feedback to the user that the labware has been properly placed. While not shown, the number of steps or items required for a particular fluid handling operation may be projected so the user can see them, e.g., "Labware Step 1 of 5" can be projected. The step numbers or labware item numbers can increase until all labware is present and properly placed for a particular fluid handling operation. If desired, the projector can provide an image that all steps are complete to permit the user or system to proceed with the fluid handling operation. Similarly, when the fluid handling operation is complete or when one or more labware components present on the support need to be replaced or refilled, the projector can provide an image prompting the user to refill or replace that particular item. In this manner, the user is provided easily viewable visual feedback to monitor the fluid handling analysis.

Figure 12:
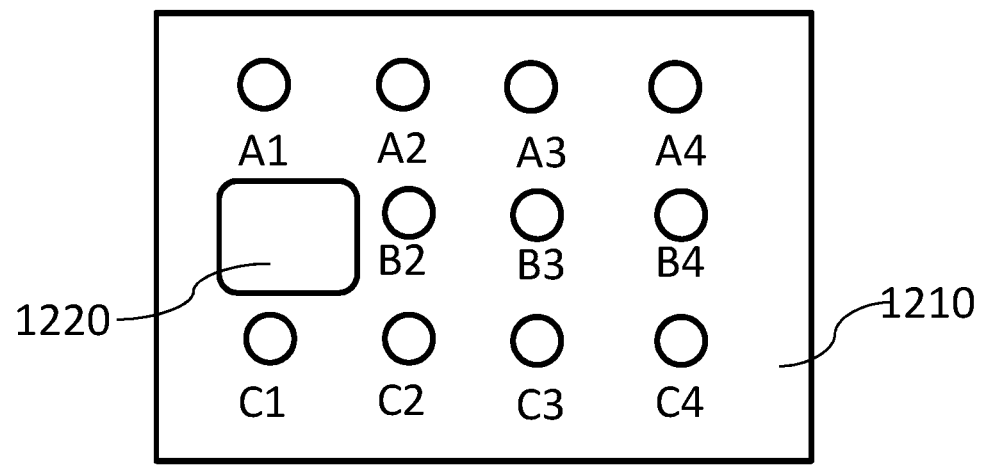
FIG. 12 is an illustration showing positioning indicia on a support, in accordance with certain instances.

In certain configurations described herein, the systems, devices and methods described herein can include a camera or other detection device to determine if a particular labware component has been properly placed on the support. The camera or detection device is typically mounted above the support and can move in three dimensions to a desired point above the support. Referring to FIG. 12, a top view of a camera 1220 positioned above a support 1210 is shown. The support 1210 may have various indexing or locating features on the support 1210 to permit the camera to determine its position. For example, in the illustration shown in FIG. 12, the support 1210 comprises a plurality of locating holes (labeled A1-C4) arranged in 3 rows and 4 columns. The camera 1220 can determine its position by reading the locating holes 1210 or can be calibrated using the locating holes to determine its current x-y coordinates based on the initial calibration. The camera 1220 can be electrically coupled to a processor (not shown) to receive a signal from the camera and/or provide a signal from the camera to move the camera. The position of the labware image (not shown) projected onto the support 1210 can be determined by the camera 1220 and/or the processor. The camera 1220 can then monitor placement of the labware and compare it to the image position to determine if the labware is properly placed. For example, the camera can receive a pixel from the projected image and can receive a pixel from the placed labware and compare the positions of the two pixels. If the pixels are within a selected distance, then the labware may be considered properly placed. To enhance accuracy of labware placement, two or more pixels from the labware can be compared to two or more pixels of the image. In some instances, if the pixel position of the placed labware is within about 5% of the labware image pixel (based on comparison of corresponding positions on the labware and the labware image), then the labware may be considered properly placed. In certain embodiments, the camera 1220 can take many different forms including, but not limited to, a digital camera, a charged coupled device (CCD) camera, an ultrasound camera, a complementary metal-oxide-semiconductor (CMOS) camera, a video camcorder, or other devices that can capture images or video. The camera can be configured to store the image, if desired, or can be electrically coupled to other components in the system to store and/or analyze the images captured by the camera.

In certain configurations, the camera can be integrated with the projector such that a single housing may comprise both the projector and the camera. By placing the camera in proximity to the projector, the camera can be positioned near the labware image and is in a position to determine if the labware has been properly placed on the support. In some instances, the projector and camera can be in separate housings but may be on the same arm or gantry such that movement of the projector results in movement of the camera. In other configurations, the projector and the camera can be independently controlled so that their positions are independent of each other. In some examples, the projector position can be fixed and the camera can be moveable in one, two or three dimensions relative to the position of the support. In other instances, the camera and the projector can both be fixed in position and the support itself can be moved to a desired position. For example, the support can be moved to a suitable position to receive a labware image from the projector. Once the camera has verified proper placement of the labware, the support can be moved to a different position so the projector can project another labware image onto a different area of the support.

In certain instances, the image provided to the support can be the same size, smaller or larger than the labware component to be placed. In some instances, the image is sized and arranged to be larger than the labware component to be placed such that placement of the labware within the image (and detection by the camera) would be proper placement. Where the image is larger, the image may have at least one dimension that is 5% or 10% larger (or at least 5% larger) than that comparable dimension of the labware component. In other instances, the image is sized and arranged to be smaller than the labware component so that the image does not interfere to a substantial degree with the camera determining of the labware has been properly placed. Where the image is smaller, the image may have at least one dimension that is 5% or 10% smaller (or at least 5% smaller) than that comparable dimension of the labware component. In some embodiments, the image can be the same size such that the various sides or dimensions of the labware are mirrored in the image.

In some embodiments, the labware component can be configured to absorb the image light. For example, the labware may comprise one or more dyes or other materials that can absorb the wavelength of light used to provide the image. Disappearance of the image would be indicative of proper placement of the labware component. If some portion of the image remains due to improper placement of the labware, then the labware can be repositioned until the image disappears from being absorbed by the labware. The dye or other material used in the labware can be selected based on the particular wavelength of light used to provide the image. In some instances, the labware component can be produced by including the absorptive material within the materials used to provide the labware component, e.g., within the plastic, glass or other component used in the labware. In other embodiments, the labware component may be reflective. For example, the labware component may comprise a reflective material or coating that can reflect light received by the projector. In some configurations, placement of the labware provides a reflection of the image of the labware. Where the labware is properly placed, the virtual image of the labware would correspond to the placed labware. Where the labware is improperly placed, the virtual image would be less than then entire virtual image of the labware. The user can reposition the labware until the entire virtual image appears from the reflection to provide proper placement of the labware.

In some instances, the support may comprise one or more materials on its surface to reflect, diffuse or otherwise assist in creation of the virtual image. In some embodiments, the support may comprise a reflective acrylic or glass coating to assist in the visualization of the image. For example, where a two-dimensional image is provided on the support, a reflective coating similar to that used on commercial projections screens can be present on the support, e.g., on one or more surfaces (or portions thereof) of the support. Where a three-dimensional image is provided on the support, the support may comprise one or more materials that can retain all, some, none or partial polarization of the projected light, depending on the exact configuration of the projector. The image gain of the support can be less than 1.0, 1.0, or greater than 1.0 depending on how bright an image is desired.

Figure 13:
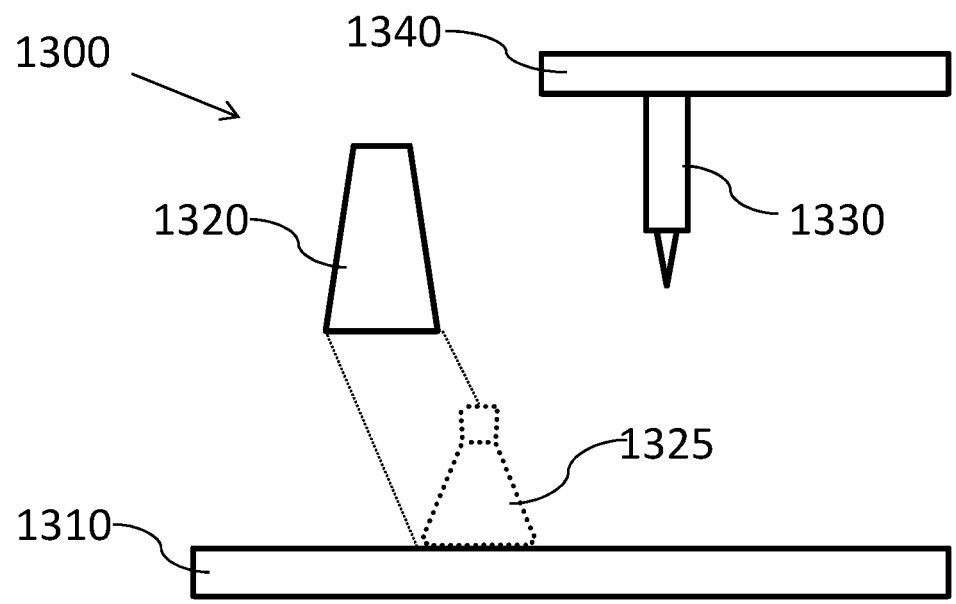
FIG. 13 is an illustration of a system comprising a support, a camera and a projector above the support, in accordance with certain examples.

In certain configurations, the projectors and supports described herein may be part of a larger fluid handling system. The phrase "fluid handling system" refers generally to a system which can receive one or more labware components, add material to or remove material from the labware component and may perform one or more analytical or chemical operations using materials in, or added to, the labware component. Referring to FIG. 13, an illustration of certain components of a fluid handling system are shown. The fluid handling system 1300 comprises a support 1310, a projector 1320 configured to provide a virtual image such as image 1325, a sampling probe 1330 and a moveable gantry, outrigger or arm 1340. The sampling probe 1330 can be configured to aspirate, dispense, aerate, degas or perform other fluid handling operations. For example, the devices, systems and methods disclosed herein may be used to aspirate a selected volume of fluid from the labware. Aspiration refers to drawing, sucking or otherwise moving the fluid into the sampling probe 1330. The exact volume aspirated into the sampling probe 1330 may vary depending on the intended end use of the fluid, e.g., chemical analysis, array fabrication and the like. In some examples, the volume of fluid aspirated into the sampling probe may vary from about 0.1 microliters to about 10 milliliters, more particularly, about 1 microliters to about 1 milliliters, e.g., about 1 mL. Subsequent to aspiration, a selected amount of the fluid drawn into the sampling probe 1330 may be dispensed into a desired container (or other labware placed on the support) or onto a desired surface. In some examples, the entire fluid volume in the sampling probe 1330 may be dispensed into another labware component, whereas in other examples, a volume smaller than the total volume aspirated into the sampling probe 1330 may be dispensed. In certain examples, the sampling probe 1330 may also be used to dispense a system fluid into a desired labware component. In some examples, the system wash fluid may be used to flush the sampling probe 1330 to ensure all the aspirated fluid has been removed from the sampling probe 1330. Additional methods of aspirating and dispensing using the devices, systems and methods disclosed herein will be readily selected by the person of ordinary skill in the art, given the benefit of this disclosure.

In certain instances, the sampling probe 1330 may be fluidically coupled to a pump or other device that can provide a positive or negative pressure to the sampling probe 1330. The sampling probe 1330 may also be fluidically coupled to a fluid reservoir that may include a fluid whose composition and properties are selected depending on the fluid to be sampled. In some examples, the system fluid is selected such that it may be used to wash the sampling probe after fluid has been dispensed from the sampling probe. In other embodiments, the system fluid may be distilled water or an aqueous solution of a detergent or other cleaner. Subsequent to cleaning, the sampling probe 1330 may be flushed with distilled water to rinse any remaining cleaner from the sampling probe. In embodiments where the fluid to be sampled is non-aqueous, e.g., is a hydrocarbon such as gasoline or oil, the system fluid may be non-polar as well. For example, where the fluid to be sampled is oil, the system fluid may be kerosene, hexane or other substantially non-polar fluids. While a single sampling probe 1330 is shown in FIG. 13, there may be two, three or more sampling probes present in a fluid handling instrument comprising a projector. The sampling probe 1330 can move in three dimensions if desired.

In use of the system 1300, the projector 1320 provides a virtual image of labware to be placed on the support 1310. A camera (not shown) can be used to determine if the labware has been properly placed. Once the labware has been properly placed, an image of another labware component can be provided by the projector 1320 if desired. This process may repeat until the desired number of labware components have all been placed onto the support 1310. The user may then initiate the fluid handling analysis. The sampling probe 1330 can add/remove fluids from the placed labware components to perform a sample analysis. In some instances, one or more fluids can be removed and subjected to further analysis and/or detection.

In other instances, the systems described herein may comprise a projector and one or more air displacement pipettes or air dispensing devices. The air dispensing devices can be fixed volume or variable volume and can be designed to couple reversible to a tip at a dispensing surface. For example, the air dispensing device may displace air by way of a piston. Depression of a plunger can cause movement of a piston. Release of the piston can provide a vacuum that is used to draw fluid into the tip coupled to the dispensing device. A further depression of the plunger can dispense the fluid within the tip. The tips are typically changed between fluids to avoid contamination. The air dispensing device may comprise a single channel or multiple channels and may be operated using electronic means to actuate the plunger or piston of the air dispensing device. Typical dispense volumes that are provided using an air dispensing device may range, for example, from about 10 microliters to about 1 milliliter. In some instances, the system may comprise a similar number of air dispensing devices as the number of microwells in a microwell plate, e.g., where a 24-well microplate is used there may be 24 air dispensing devices present with each dispensing device configured to remove or provide fluid to a respective well of the microplate.

In certain configurations, where a plurality of different images are to be provided to a support, the images can be sequentially provided or can all be provided simultaneously. Where simultaneous images are provided, the camera can determine if all labware has been placed. Images representing properly placed labware may be removed, whereas images representing improperly placed labware may remain until the user has placed the labware in a proper position. In an alternative configuration, images representing improper placement can be flashed or changed color to alert the user to improper placement of that particular labware component. As noted herein, the entire image of each labware component need not be provided to the support, e.g., 50% or less of the entire image can be provided to permit the user to place the labware.

In certain embodiments, the projector present in a fluid handling system can be above, below or to the side of the support. The projector can also be moveable. For example, the projector 1320 can move in one, two or three directions to provide an image to the support 1310. The projector 1320 can provide user instructions on the support 1310 or outside of the support 1310, e.g., outside of a housing of the fluid handling instrument. The provided images may remain during handling of the fluid or can be removed during fluid handling operations. As noted herein, the image provided in the fluid handling system can be provided using visible light, non-visible light or combinations thereof, e.g., images can be provided using visible light and user instructions, calibration references, markings on the support, etc. can be provided using non-visible light. The projector 1320 of the fluid handling system may comprise one or more LCD panels, DLP chips and a light source. As noted above, the fluid handling system 1300 may comprise a common light source that is used for the projector 1320 and for another component of the system 1300, e.g., for a detector. The camera of the fluid handling system can be configured to receive at least one pixel representative of the placed labware component and compare the position of the received pixel to a pixel position of the provided image to determine if the labware component has been properly placed, e.g., the camera can be configured to receive at least two different pixels representative of the labware component and compare the position of the received two different pixels to a first pixel position of the image and to a second pixel position of the image to determine if the labware component has been properly placed. The camera can be positioned adjacent to the projector 1320, above the projector 1320, below the projector 1320 or in other positions to permit the camera to receive light and/or images. If desired, the support 1310 of the fluid handling system 1300 can comprise one or more positioning indicators, e.g., numbers, letters, symbols, etc. that can be read by the camera. The fluid handling system 1300 may comprise a detector, or an external detector can be used in the fluid analysis. In some instances, a second projector may also be included in the system 1300. The second projector can be positioned above the support 1310, below the support 1310, to the side of the support 1310 or at other areas.

While a fluid handling system is described herein as comprising a projector, other instruments designed to perform analyses or operations not related to fluid handling may also comprise a projector. For example, a mass spectrometer may comprise a projector to provide images to guide a user how to assemble the components of an ion source. The images can be provided at the site of the ion source or projected onto the housing of the instrument to provide assistance in assembling the ion source. Chromatography systems may comprise a projector to provide images of how the various components of the system, e.g., a column, microfluidic device etc., are to be coupled to each other. Inductively coupled plasma devices may include a projector to provide an image of how the components of the plasma torch are to be assembled or how sample is to be introduced into the systems.

In some configurations, the systems can be configured to permit a user to troubleshoot an experiment and/or troubleshoot any problems with the system. For example, the projector can provide user instructions to permit a user to follow the steps and determine where an error occurred in a particular fluid operation. In other instances, the instructions may prompt the user to test or inspect various instrument components to ensure the system is properly functioning. In certain examples, a sequential listing of steps can be provided by the projector to permit the user to test the system and/or perform system diagnosis. In other configurations, the projector can be used to indicate the location of interest. For example, if the system has a problem loading tips, the projector can illuminate the tip box with the problem and then instruct the user of the corrective actions to attempt to resolve the issue.

Figure 14:
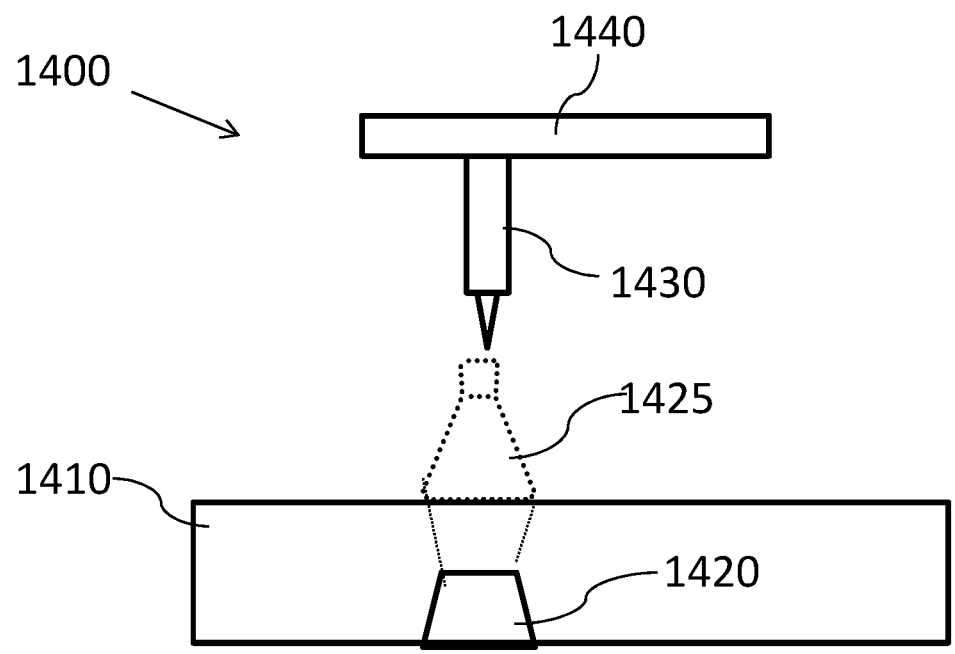
FIG. 14 is an illustration of a system comprising a support, a camera and a projector within the support, in accordance with certain examples.

In certain configurations, the fluid handling systems described herein may comprise an integral projector within the support. Referring to FIG. 14, a fluid handling system 1400 is shown comprising a support 1410, a projector 1420 configured to provide a virtual image such as image 1425, a sampling probe 1430 and a moveable gantry, outrigger or arm 1440. The sampling probe 1430 can be configured similar to the sampling probe 1330, e.g., to aspirate, dispense, aerate or degas fluids. The projector 1420 is integral, e.g., within, the support 1410 and can be configured to project images onto the support 1410 in a manner similar to a rear projection television. The support 1410 may comprise suitable materials to permit receipt of the images and display them on and/or above the support 1410. As shown in FIG. 14, the projector 1420 is positioned toward a bottom surface of the support 1410, but if desired the projector can be positioned toward the top surface of the support 1410, centrally within the support 1410 or in other areas of the support 1410. In addition, the projector 1420 need not be in the center of the support 1410 but can be positioned to one side of the support 1410 if desired. The image 1425 provided by the projector 1420 may be an entire image of the labware component to be placed, an image with a size less than the size of the labware component to be placed or an image with a size greater than the size of the labware component to be placed. For example, where the projector is configured to provide an image of a microtiter plate, the image may be the same size as the microtiter plate, a smaller size than the microtiter plate or a greater size than the microtiter plate. The projector 1420 can provide an image using visible light or non-visible light as described herein. The projector 1420 may take any of the configurations described herein, e.g., one or more LCD panels, a DLP chip, a light source such as a light emitting diode, etc. As noted herein, the system 1400 may comprise a common light source used for the projector and for another component of the system 1400, e.g., a detector. The projector 1420 may provide user instructions onto the support 1410 or to another area outside of the support 1410. The system 1400 may also comprise a camera to detect if the labware is properly placed and/or to capture images used for other reasons, e.g., to image the wells of a microtiter plate. The camera can be electrically coupled to a processor, a memory unit, and/or other components. In certain configurations, a second projector may also be included in the system 1400. The second projector can be positioned within the support 1410, above the support 1410, below the support 1410, to the side of the support 1410 or at other areas.

Figure 15A:
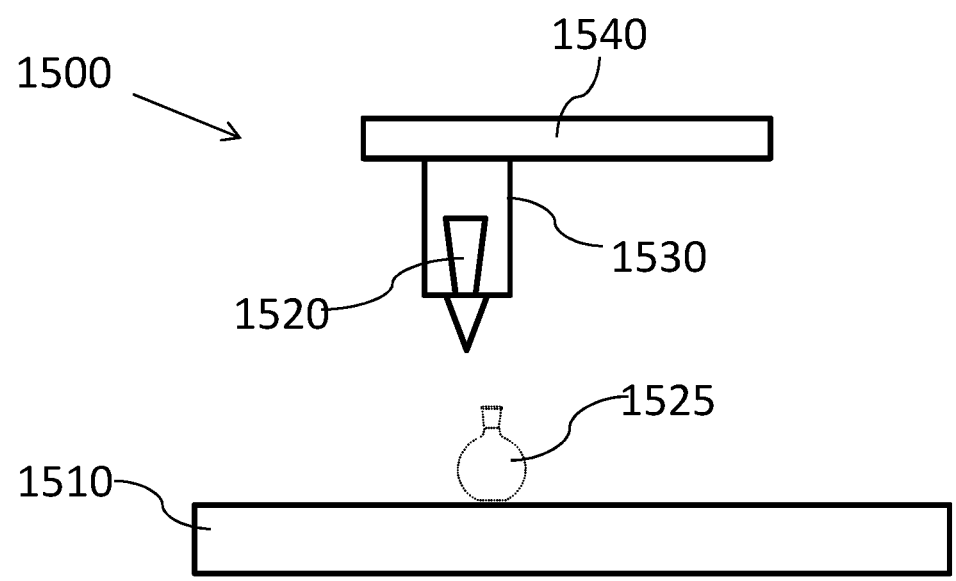
FIG. 15A is an illustration of a system comprising a support, a sampling probe, a camera and a projector within the sampling probe, in accordance with certain examples.
Figure 15B:
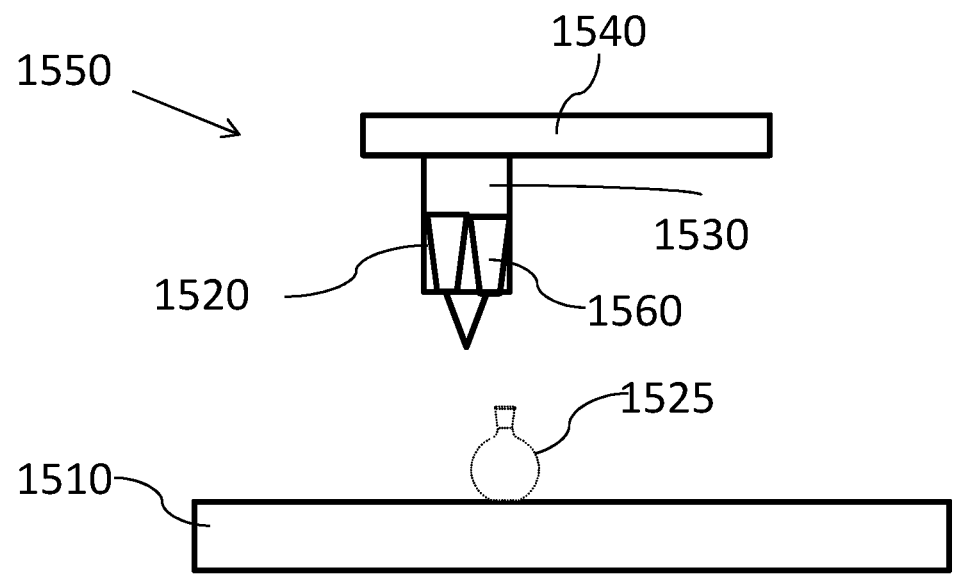
FIG. 15B is an illustration of a system comprising a support, a sampling probe, a camera and a projector both within the sampling probe, in accordance with certain examples.

In certain configurations, the projector can be positioned in the sampling probe itself. Referring to FIG. 15A, a fluid handling system 1500 is shown that comprises a support 1510, a projector 1520 configured to provide a virtual image such as image 1525, a sampling probe 1530 and a moveable gantry, outrigger or arm 1540. The terminal portion of the projector 1520 is shown as being within, e.g., integral to, the sampling probe 1530. The projector 1520 can be fluid tight, if desired, so that no fluid in the sampling probe 1530 contacts the projector 1520. In addition, one or more fiber optic couplings, fiber optic cables, light pipes, mirrors, prisms, etc. may optically couple the projection lens to other projector components not in the sampling probe 1530. Movement of the probe 1530 results in movement of the projector 1520. If desired, the projector 1520 can provide a second image of another labware component, e.g., after the image 1525 or at the same time as providing the image 1525. The image provided by the projector 1520 can be the same size as the labware to be placed on the support 1510, a size less than the size of the labware to be placed on the support 1510 or a size greater than the size of the labware to be placed on the support 1510, e.g., the projector 1520 can provide an image of a microwell plate that is less than an entire image of the microwell plate, the same size as the microwell plate or a size greater than the size of the microwell plate. The projector 1520 may use visible light, non-visible light or combinations thereof. The projector 1520 may take any of the projector configurations described herein, e.g., may comprise one or more LCD panels, a DLP chip, a light source, etc. The system 1500 may comprise a common light source that is used by the projector 1520 and another component of the system 1500, e.g., by a detector. The projector 1520 may provide user instructions on the support 1510 or other area of the system 1500. In some instances, the sampling probe 1530 may comprise an integral camera. For example and referring to FIG. 15B, a system 1550 comprising a camera 1560 within the sampling probe 1530 is shown. Movement of the sampling probe 1530 also moves the projector 1520 and the camera 1560. While the camera 1560 is shown in the sampling probe 1530 it may instead be located outside of the sampling probe 1530. The various components of the systems 1500 and 1550 can be electrically coupled to a processor that can be used, for example, to determine if the labware component is properly placed on the support 1510 from one or more pixels received by the camera. The support 1510 may comprise suitable materials, e.g., a reflective material, material effective to diffuse light received from the projector 1520, etc. to permit the user to see the images provided by the projector 1520. In certain configurations, a second projector may also be included in the systems 1500 and 1550. The second projector can be positioned within the support 1510, above the support 1510, below the support 1510, to the side of the support 1510, within the sampling probe 1530 or at other areas.

In certain embodiments, a method comprising projecting an image of some portion of the labware component onto the support can be used to assist a user in placement of a labware component. In some instances, the method comprises projecting an entire image of the labware component onto the support. In other examples, the method comprises projecting user instructions. In further configurations, the method comprises determining if the labware component has been placed at a proper labware site. In other embodiments, the method comprises projecting the image from above the support. In certain instances, the method comprises projecting from below the support. In other embodiments, the method comprises projecting from a side of the support. In additional instances, the method comprises using a processor to compare the projected image and a position of a placed labware component on the support prior to analysis using the labware component. In some examples, the method comprises projecting a second image different from the projected image. In further embodiments, the method comprises projecting the image and the second image from a single projector or from two different projectors.

In certain examples, a method comprising projecting an image (within or adjacent to an instrument) of some portion of an analytical component, e.g., a sample holder, chromatography column, ion source, nebulizer, plasma torch, detector, etc., to assist a user in proper placement of the analytical component. If desired, the projector can be positioned within the instrument. In some instances, the method comprises projecting an entire image of the analytical component onto the support. In other examples, the method comprises projecting user instructions. In further configurations, the method comprises determining if the analytical component has been placed at a proper site. In other embodiments, the method comprises projecting the image from above the analytical component site. In certain instances, the method comprises projecting from below the analytical component site. In other embodiments, the method comprises projecting from a side of the analytical component site. In additional instances, the method comprises using a processor to compare the projected image and a position of a placed analytical component on the support prior to analysis using the analytical component. In some examples, the method comprises projecting a second image different from the projected image. In further embodiments, the method comprises projecting the image and the second image from a single projector or from two different projectors.

In certain embodiments, a method of assisting in placement of a labware component at a site on a support of a fluid handling system, the method comprising providing a fluid handling system comprising a projector configured to provide an image of some portion of the labware component onto the support is provided. In some configurations, the method comprises providing the support. In other configurations, the method comprises providing an image of the some portion of the labware component. In additional instances, the method comprises providing an image of user instructions. In further embodiments, the method comprises providing the image of the user instructions in a space other than the support. In some instances, the image of the labware component provided onto the support and the image of the user instructions are simultaneously provided. In certain examples, the method comprises providing a lens. In some embodiments, the method comprises providing a camera. In further embodiments, the method comprises configuring the system to determine if the labware component has been properly placed by comparing the image and placement of the labware component. In some examples, the method comprises providing a detector.

In certain examples, a method of facilitating analysis of a fluid in a fluid receptacle is described. In certain instances, the method comprises providing a projector configured to provide an image of at least one labware component onto a support to assist in placing the at least labware component at a labware site of the support, and providing instructions for using the projector with a fluid handling system comprising the support. In some examples, the method comprises providing the support. In further examples, the method comprises providing an image of the some portion of the labware component. In some embodiments, the method comprises providing an image of user instructions. In certain examples, the method comprises providing the image of the user instructions in a space other than the support. In some examples, the image of the labware component provided onto the support and the image of the user instructions are simultaneously provided. In certain embodiments, the method comprises providing a lens. In other examples, the method comprises providing a camera. In some instances, the method comprises configuring the system to determine if the labware component has been properly placed by comparing the image and placement of the labware component. In certain embodiments, the method comprises providing a detector.

In certain instances, a method of handling fluids for analysis is disclosed. In some embodiments, the method comprises providing a virtual image of a labware component onto a support of a fluid handling system. In some embodiments, the method comprises determining if a labware component receptacle placed onto the support is substantially aligned with the projected image. In further embodiments, the method comprises determining step is performed using a camera that is configured to receive at least one pixel representative of the position of the placed labware component on the support and using a processor to compare the received pixel with a pixel position of the projected image. In some instances, the method comprises configuring the labware component as a fluid device comprising a plurality of fluid receptacles and illuminating one or more individual receptacles of the fluid receptacle using the same device used to provide the virtual image. In certain examples, the method comprises providing the virtual image using a projector. In some embodiments, the method comprises configuring the projector with a DLP chip and a light source. In other embodiments, the method comprises providing a second virtual image, different from the virtual image, onto the support. In some examples, the method comprises configuring the provided virtual image to be less than 50% of a size of the labware component. In other embodiments, the method comprises configuring the provided virtual image to comprise substantially the same x-y dimensions as x-y dimensions of the labware component. In other embodiments, the method comprises discontinuing providing of the virtual image after proper placement of the labware component is determined. In certain examples, the method comprises determining the type of support present in the fluid handling system.

In certain embodiments, the fluid handling systems described herein, and their methods of using them, can be implemented using a computer or other device that includes a processor. The computer system can be separate from the fluid handling system or may be integrated with the fluid handling system. As noted herein, the processor can be used to control what image is provided, the position of the projector and/or camera, comparison of the virtual image position with the placed labware position, etc. The computer system typically includes at least one processor electrically coupled to one or more memory units to receive input data from staff and/or retrieve images for projecting onto the support. The computer system may be, for example, a general-purpose computer such as those based on Unix, Intel PENTIUM-type processor, Motorola PowerPC, Sun Ultra-SPARC, Hewlett-Packard PA-RISC processors, or any other type of processor. One or more of any type computer system may be used according to various embodiments of the technology. Further, the system may be connected to a single computer or may be distributed among a plurality of computers attached by a communications network. A general-purpose computer system may be configured, for example, to perform any of the described functions including but not limited to: image retrieval, camera control, projector control, comparison of image positions to labware positions, control of the sampling probes or the like. It should be appreciated that other functions, including network communication, can be performed and the technology is not limited to having any particular function or set of functions. Various aspects of the systems and methods may be implemented as specialized software executing in a general-purpose computer system. For example, a protocol configured to sequentially display images of labware can be implemented. The computer system may include a processor connected to one or more memory devices, such as a disk drive, memory, or other device for storing data. Memory is typically used for storing programs and data during operation of the computer system. Components of the computer system may be coupled by an interconnection device, which may include one or more buses (e.g., between components that are integrated within a same machine) and/or a network (e.g., between components that reside on separate discrete machines). The interconnection device provides for communications (e.g., signals, data, instructions) to be exchanged between components of the system. The computer system typically is electrically coupled to a power source, the projector and/or the camera, such that electrical signals may be provided to and from the computer and the coupled devices. The computer system may also include one or more input devices, for example, a keyboard, mouse, trackball, microphone, touch screen, manual switch (e.g., override switch) and one or more output devices, for example, a printing device, display screen, speaker. In addition, the computer system may contain one or more interfaces that connect the computer system to a communication network (in addition or as an alternative to the interconnection device). The computer system may also include suitable circuitry to convert signals received from the camera and/or sampling probe. Such circuitry can be present on a printed circuit board or may be present on a separate board or device that is electrically coupled to the printed circuit board through a suitable interface, e.g., a serial ATA interface, ISA interface, PCI interface or the like or through one or more wireless interfaces, e.g., Bluetooth, WiFi, Near Field Communication or other wireless protocols and/or interfaces.

In certain embodiments, the storage system of the computer typically includes a computer readable and writeable nonvolatile recording medium in which labware images can be stored that can be used by a program to be executed by the processor or information stored on or in the medium to be processed by the program. The medium may, for example, be a disk, solid state drive or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). It may be located in the storage system or in the memory system. The processor generally manipulates the data within the integrated circuit memory and then copies the data to the medium after processing is completed. For example, the processor may receive signals from the camera to determine if the labware has been properly placed. A variety of mechanisms are known for managing data movement between the medium and the integrated circuit memory element and the technology is not limited thereto. The technology is also not limited to a particular memory system or storage system. In certain embodiments, the computer system may also include specially-programmed, special-purpose hardware, for example, an application-specific integrated circuit (ASIC) or a field programmable gate array (FPGA). Aspects of the technology may be implemented in software, hardware or firmware, or any combination thereof. Further, such methods, acts, systems, system elements and components thereof may be implemented as part of the computer system described above or as an independent component. Although a computer system is described by way of example as one type of computer system upon which various aspects of the technology may be practiced, it should be appreciated that aspects are not limited to being implemented on the described computer system. Various aspects may be practiced on one or more computers having a different architecture or components. The computer system may be a general-purpose computer system that is programmable using a high-level computer programming language. The computer system may be also implemented using specially programmed, special purpose hardware. In the computer system, the processor is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME), Windows XP, Windows Vista, Windows 7, Windows 8 or Windows 10 operating systems available from the Microsoft Corporation, MAC OS X, e.g., Snow Leopard, Lion, Mountain Lion or other versions available from Apple, the Solaris operating system available from Sun Microsystems, or UNIX or Linux operating systems available from various sources. Many other operating systems may be used, and in certain embodiments a simple set of commands or instructions may function as the operating system.

In certain examples, the processor and operating system may together define a computer platform for which application programs in high-level programming languages may be written. It should be understood that the technology is not limited to a particular computer system platform, processor, operating system, or network. Also, it should be apparent to those skilled in the art, given the benefit of this disclosure, that the present technology is not limited to a specific programming language or computer system. Further, it should be appreciated that other appropriate programming languages and other appropriate computer systems could also be used. In certain examples, the hardware or software can be configured to implement cognitive architecture, neural networks or other suitable implementations. If desired, one or more portions of the computer system may be distributed across one or more computer systems coupled to a communications network. These computer systems also may be general-purpose computer systems. For example, various aspects may be distributed among one or more computer systems configured to provide a service (e.g., servers) to one or more client computers, or to perform an overall task as part of a distributed system. For example, various aspects may be performed on a client-server or multi-tier system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). It should also be appreciated that the technology is not limited to executing on any particular system or group of systems. Also, it should be appreciated that the technology is not limited to any particular distributed architecture, network, or communication protocol.

In some instances, various embodiments may be programmed using an object-oriented programming language, such as SmallTalk, Basic, Java, C++, Ada, or C# (C-Sharp). Other object-oriented programming languages may also be used. Alternatively, functional, scripting, and/or logical programming languages may be used. Various configurations may be implemented in a non-programmed environment (e.g., documents created in HTML, XML or other format that, when viewed in a window of a browser program, render aspects of a graphical-user interface (GUI) or perform other functions). Certain configurations may be implemented as programmed or non-programmed elements, or any combination thereof.

In certain embodiments, the system may take the form of (or interact with) a mobile device, e.g., a phone or a tablet, that is configured to control use of the fluid handling system. The mobile device may wirelessly communicate with the fluid handling system to send signals and receive signals or data from the fluid handling system. In addition, the mobile device can be pre-programmed or pre-configured to implement certain fluid operations that can automatically load from the mobile device into the fluid handling system. If desired, the mobile device can be designed for use with two or more different fluid handling systems to permit a single mobile device to implement the same or different fluid handling operations on the two or more fluid handling systems. The mobile device may be pre-loaded with the particular images to be provided by the projector. The mobile device can couple to the projector in a wireless manner, e.g., using near field communication, Bluetooth, or other wireless devices and protocols, to send the images from the mobile device to the projector. One or more menus can be present on the mobile device to permit the user to select the particular labware to be placed on the support and/or operate the fluid handling system. The selected images can be communicated to the system to permit the projector to provide the appropriate images to the support. In other instances, the system may comprise a display or touch screen that is designed to display a menu permitting image selection and/or operation of the fluid handling system. In some embodiments, the system may send images, or a listing of the labware to be placed, to be the mobile device. The user may review the images or listing and retrieve the appropriate labware to be placed on the support. The images (or listing) can be color coded, if desired, to further assist the user in retrieval and/or placement of the labware.

Certain specific examples are described below to illustrate some aspects of the technology described herein.

Example 1

Figure 16:
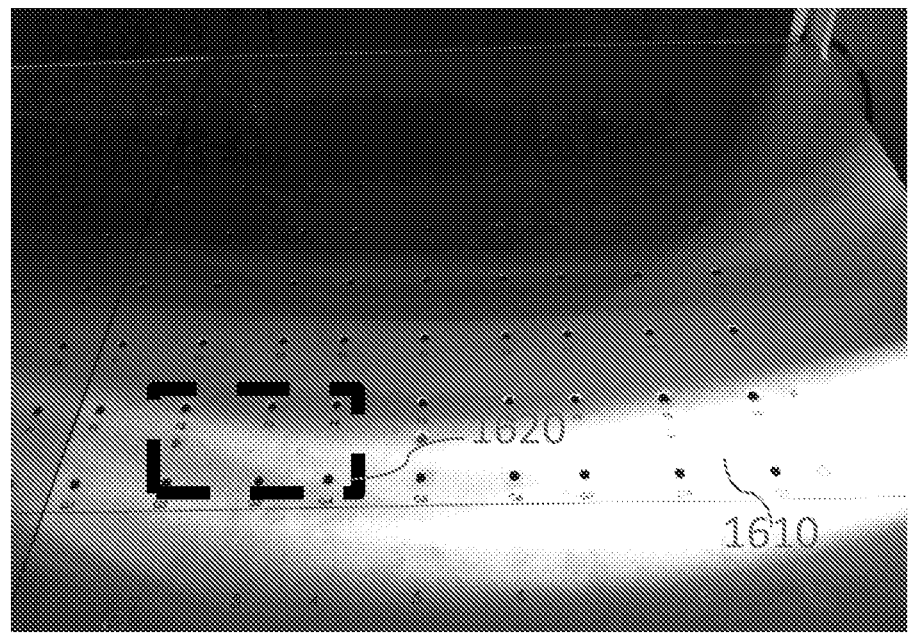
FIG. 16 is a photograph showing a support and an image of labware on the support, in accordance with certain embodiments.

Referring to FIG. 16, a photograph of a support 1610 is shown. The support 1610 comprises a plurality of rows and columns. In this configuration, there are 7 rows and 9 columns. A virtual image 1620 of a microtiter plate can be provided onto the support 1610 to assist a user in placement of the labware. The image 1620 is projected adjacent to locating holes on the support 1610 to permit placement of the microtiter plate into a receiver (not shown) that plugs into the locating holes to hold the labware in place.

Example 2

Figure 17:
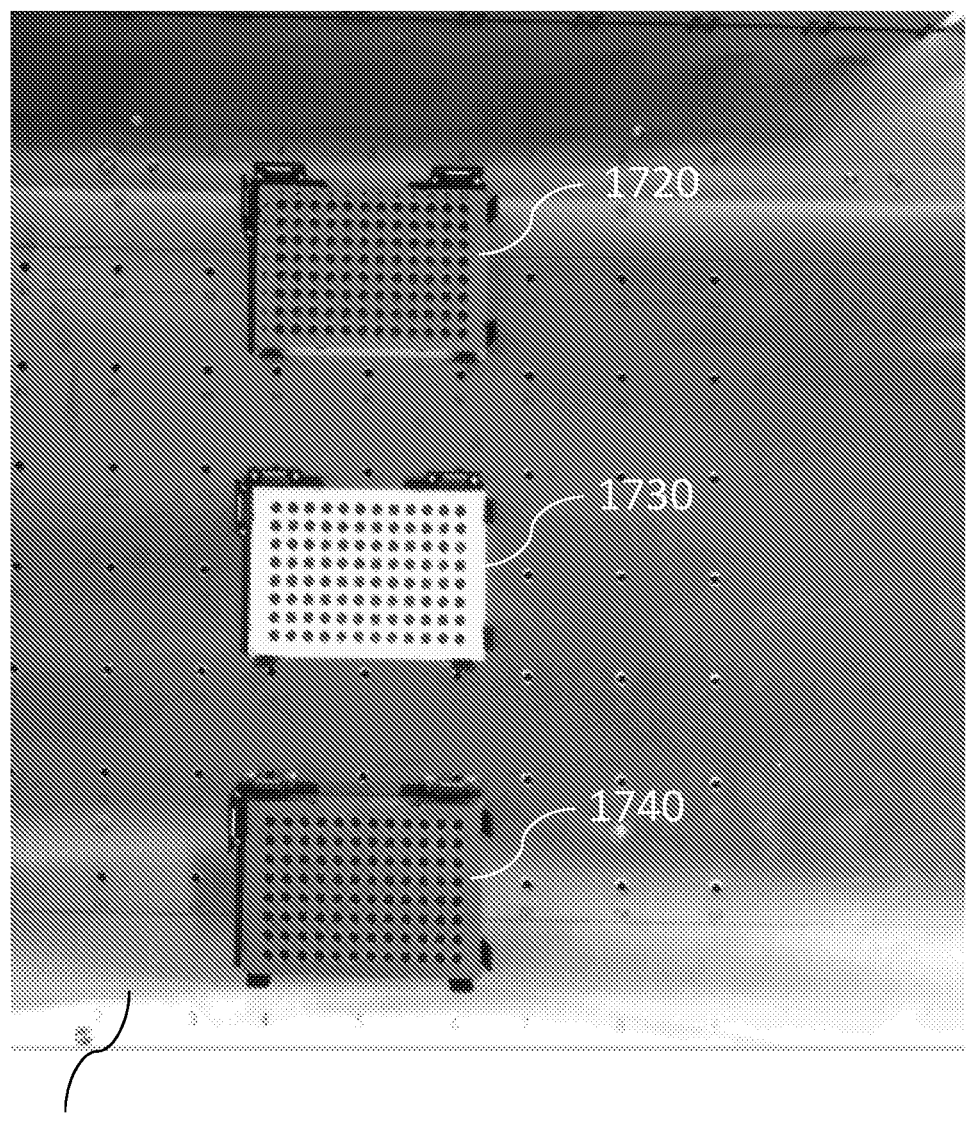
FIG. 17 is a photograph showing a support and three placed microtiter plates on the support, in accordance with certain configurations.

Referring to FIG. 17, a photograph showing placement of 3 microtiter plates 1720, 1730, 1740 onto a support 1710 is shown. To effectuate placement of the microtiter plates 1720, 1730 and 1740, a virtual image (not shown) is first projected in the same place. The microtiter plates are placed into a receiver, and then each of the plates 1720, 1730 and 1740 is placed in the locating holes over the respective image.

When introducing elements of the aspects, embodiments and examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

The invention claimed is:

1. A fluid handling system comprising:
    a support configured to receive at least one labware component at a labware site on the support; and
    a projector configured to guide alignment of the at least one labware component at the labware site at least by providing an image of the at least one labware component onto the support;
    at least one camera; and
    a device comprising:
        one or more processors; and
        memory storing instructions that, when executed by the device, cause the one or more processors to assist in guiding the alignment by:
            determining whether the at least one labware component is aligned on the support based on a comparison between one or more first pixels representing the at least one labware component and one or more second pixels representing the image of the at least one labware component;
            causing the projector to provide the image using a first color based on the at least one labware component being aligned at the labware site; and
            causing the projector to provide the image using a second color, different from the first color, based on the at least one labware component not being aligned at the labware site.

2. The fluid handling system of claim 1, in which the projector is positioned above the support.

3. The fluid handling system of claim 1, in which the projector is configured to provide a second image of a second labware component onto the support.

4. The fluid handling system of claim 1, in which the projector is positioned below the support.

5. The fluid handling system of claim 1, in which the projector is configured to project the image that is less than an entirety of the at least one labware component.

6. The fluid handling system of claim 1, in which the support is configured to receive a microwell plate comprising a plurality of individual wells and in which the projector is configured to project an image of the microwell plate that is less than an entire image of the microwell plate.

7. The fluid handling system of claim 1, in which the support is configured to receive a microwell plate comprising a plurality of individual wells and in which the projector is configured to project an image of the microwell plate that is an entire image of the microwell plate.

8. The fluid handling system of claim 1, in which the projector is configured to project the image using visible light.

9. The fluid handling system of claim 1, in which the projector is configured to project the image using non-visible light.

10. The fluid handling system of claim 1, in which the projector comprises a DLP chip and a light source.

11. The fluid handling system of claim 1, in which the projector comprises a liquid crystal panel and a light source.

12. The fluid handling system of claim 1, in which the fluid handling system comprises a common light source that is used as a light source of the projector and as a light source of a detector of the fluid handling system.

13. The fluid handling system of claim 12, in which the light source comprises a lamp, a light emitting diode, a laser, or a device that emits light.

14. The fluid handling system of claim 1, in which the projector is further configured to project user instructions.

15. The fluid handling system of claim 1, in which the image of the at least one labware component provided by the projector is at least 5% smaller than the at least one labware component.

16. The fluid handling system of claim 1, in which the support comprises a reflective material.

17. The fluid handling system of claim 1, in which the support comprises a material effective to diffuse light received from the projector.

18. The fluid handling system of claim 1, further comprising a second projector configured to provide an image different from the image of the at least one labware component.

* * * * *